United States Patent [19]
Yasutoshi et al.

[11] Patent Number: 6,037,534
[45] Date of Patent: Mar. 14, 2000

[54] KEYBOARD MUSICAL INSTRUMENT AND ELECTRIC TUTOR FOR GUIDING FINGERS ON KEYBOARD

[75] Inventors: Kaneko Yasutoshi; Kawamura Kiyoshi, both of Shizuoka-ken, Japan

[73] Assignee: Yamaha Corporation, Hamamatsu, Japan

[21] Appl. No.: 09/223,131

[22] Filed: Dec. 30, 1998

[30] Foreign Application Priority Data

Jan. 5, 1998 [JP] Japan .................................. 10-000381
Oct. 23, 1998 [JP] Japan .................................. 10-302952

[51] Int. Cl.[7] .................................................. G09B 15/08
[52] U.S. Cl. .................. 84/477 R; 84/423 R; 84/464 A; 84/470 R; 84/478; 84/479 A
[58] Field of Search .................................. 84/423 R, 433, 84/464 A, 464 R, 470 R, 477 R, 478, 479 A

[56] References Cited

U.S. PATENT DOCUMENTS

| | | | |
|---|---|---|---|
| 3,958,487 | 5/1976 | Goldman | 84/478 |
| 4,040,324 | 8/1977 | Green | 84/478 |
| 4,516,465 | 5/1985 | Kani . | |
| 5,107,743 | 4/1992 | Decker | 84/478 |

FOREIGN PATENT DOCUMENTS 8-248955   9/1996   Japan .

*Primary Examiner*—Robert E. Nappi
*Assistant Examiner*—Marlon Fletcher
*Attorney, Agent, or Firm*—Graham & James LLP

[57] ABSTRACT

An electric tutor is assembled with an upright piano having a keyboard and a key stop rail laterally extending over the rear end portions of the black/white keys, and includes a comb-like flexible indicator attached to the key stop rail, wherein the comb-like flexible indicator has flexible insulating strips connected to a rigid printed board attached to the key stop rail by means of connectors and lying on the black/white keys, optical indicators attached to the flexible insulating strips and signal lines printed on the back surfaces of the flexible insulating strips for selectively supplying driving signals to the optical indicators for radiating light, thereby guiding the fingers of a player in accordance with a music score.

34 Claims, 17 Drawing Sheets

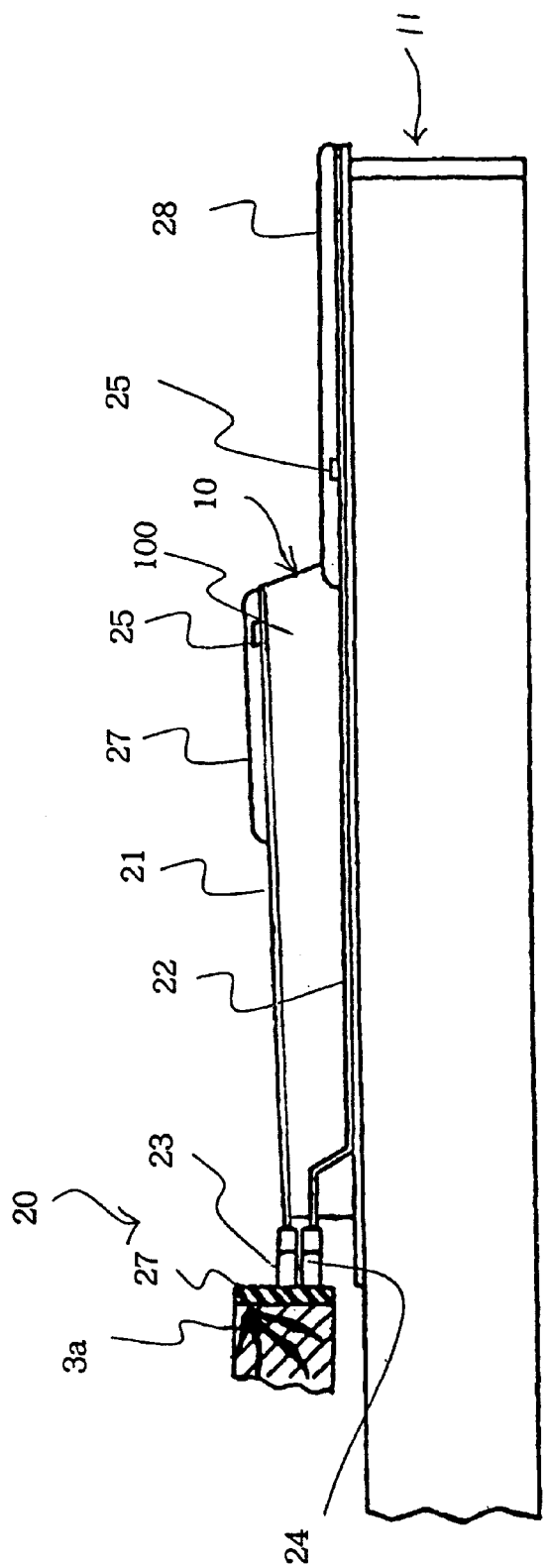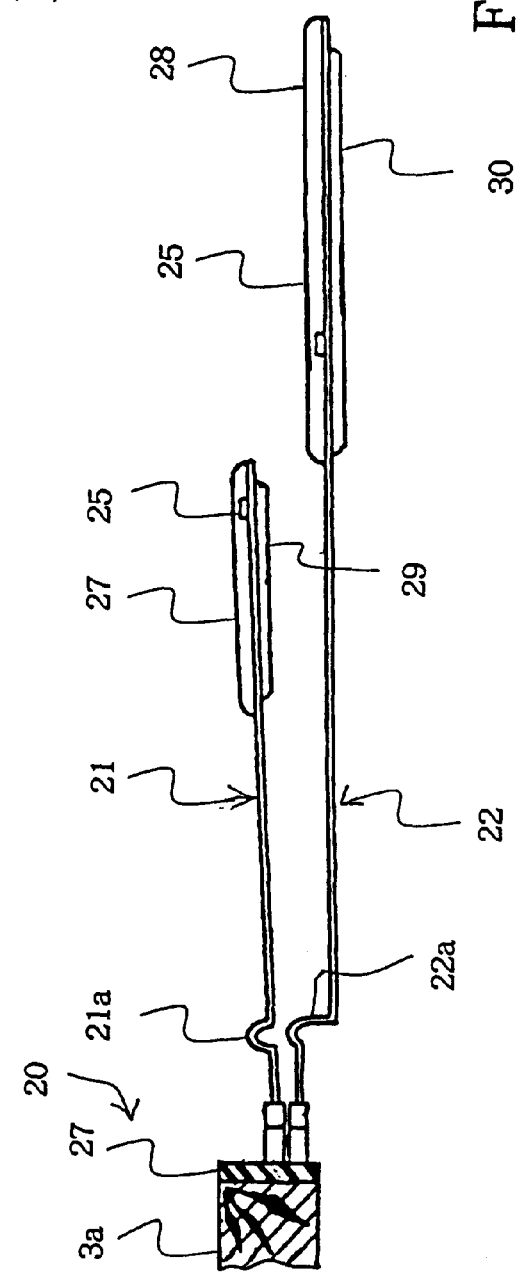
Fig. 3
Fig. 4

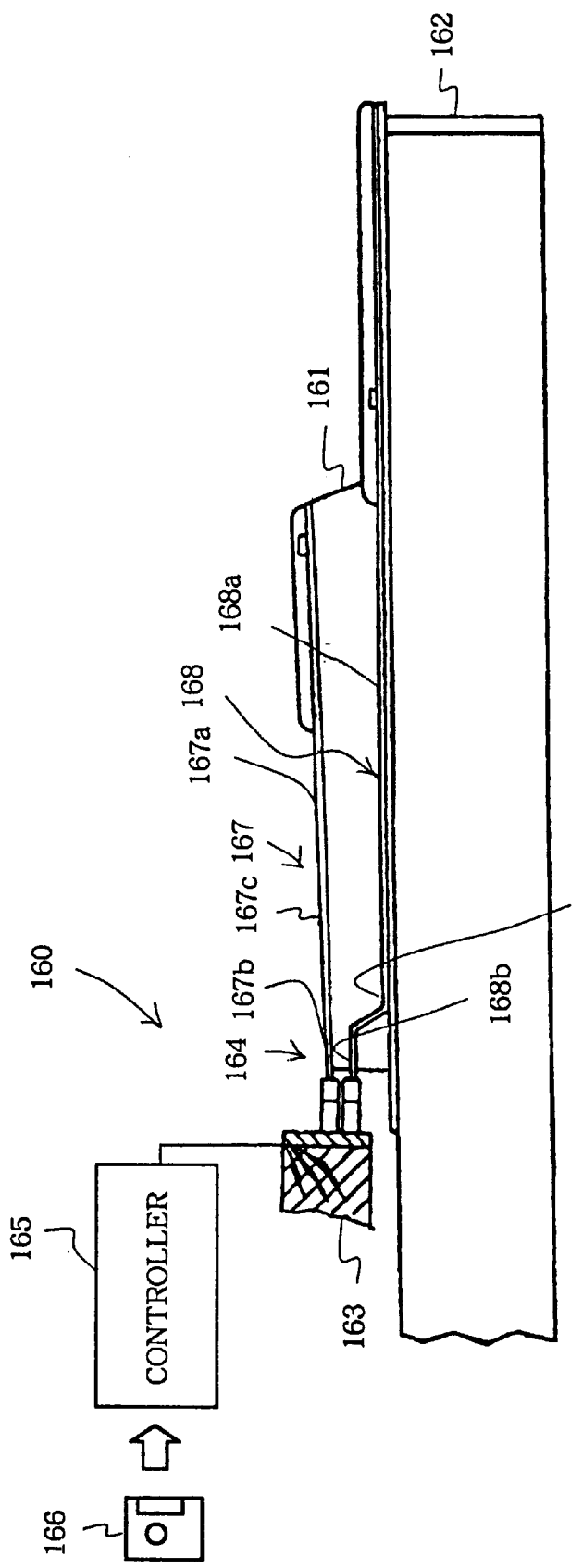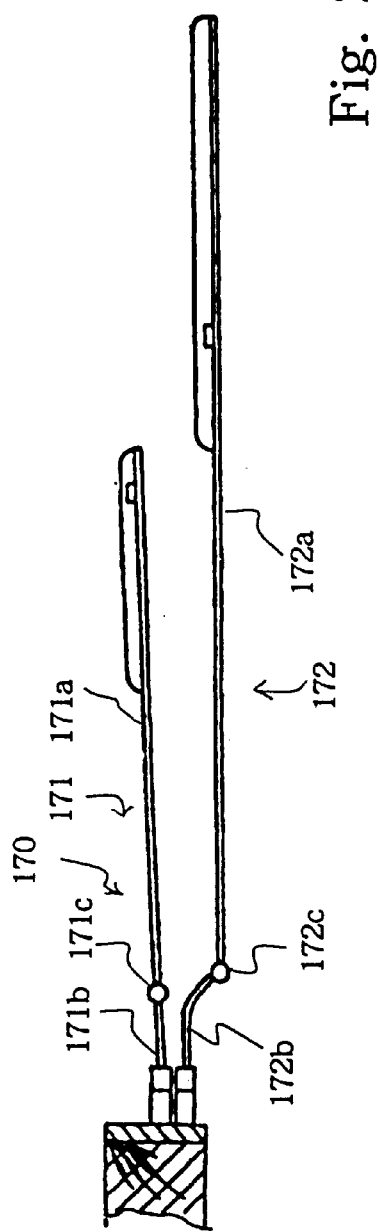

KEYBOARD MUSICAL INSTRUMENT AND ELECTRIC TUTOR FOR GUIDING FINGERS ON KEYBOARD

FIELD OF THE INVENTION

This invention relates to a keyboard musical instrument and, more particularly, to a keyboard musical instrument equipped with an electric tutor for fingering on the keyboard.

DESCRIPTION OF THE RELATED ART

It is said that beginners hardly make progress in musical instruments by themselves. The beginner must learn how to read a musical score and practice the fingering in accordance with a series of notes on the musical score. In order to assist the beginner in the practicing the fingering, electric tutors have been proposed for a keyboard musical instrument. The electric tutor optically indicates keys to be depressed on the keyboard.

One of the prior art electric tutors sequentially illuminates the keys to be depressed from a light source over the keyboard. Another prior art electric tutor requires partially transparent keys. A light source is provided under the keyboard, and selectively illuminates the transparent portions of the keys.

Following problems are encountered in the prior art electric tutors. A trainee feels the optical indication given by the first prior art electric tutor vague. The space over the keyboard is usually bright, and the optical beam is incident on the bright surfaces of the keys. The optical indication is less distinguishable on the bright surfaces. Thus, the problem inherent in the first prior art electric tutor is vagueness. On the other had, the problem in the second prior art electric tutor is narrow applications. An electronic keyboard has keys formed of synthetic resin, and the manufacturer easily makes parts of the keys transparent. However, an acoustic keyboard musical instrument usually has keys formed of wood, and front pins are attached to the back surfaces of the keys. It is quite difficult to make the wooden keys partially transparent, and the second prior art electric tutor is hardly installed in the acoustic keyboard musical instrument.

SUMMARY OF THE INVENTION

It is therefore an important object of the present invention to provide an electric tutor, which distinguishably indicates keys to be depressed regardless of the material used for the keys.

In accordance with one aspect of the present invention, there is provided a keyboard musical instrument comprising a stationary member extending in a certain direction, a keyboard including a plurality of keys arranged in the certain direction and movable between respective rest positions and respective end positions with respect to the stationary member, a sound generating means associated with the keyboard for producing sounds corresponding to depressed keys of the keyboard, and a photo-radiating system including a plurality of flexible strips having first end portions supported by the stationary member and second end portions respectively lying on the plurality of keys and moved together with the plurality of keys, a plurality of optical indicators respectively provided on the plurality of flexible strips and a driving signal supplying means electrically connected to the plurality of optical indicators and causing the plurality of optical indicators to selectively radiate rays of light along a tune.

The photo-radiating system may guide the fingers of a player during a practice of the tune.

In accordance with another aspect of the present invention, there is provided an electric tutor associated with a keyboard musical instrument having a plurality of keys comprising a plurality of flexible strips having first end portions supported by the stationary member and second end portions respectively lying on the plurality of keys and moved together with the plurality of keys, a plurality of optical indicators respectively provided on the plurality of flexible strips and a driving signal supplying means electrically connected to the plurality of optical indicators and causing the plurality of optical indicators to selectively radiate rays of light along a tune so as to inform a player of an order of the plurality of keys to be depressed.

BRIEF DESCRIPTION OF THE DRAWINGS

The features and advantages of the keyboard musical instrument and the electric tutor will be more clearly understood from the following description taken in conjunction with the accompanying drawings in which:

FIG. 3 is a side view showing the composite flexible indicator put on the keyboard of the upright piano;

FIG. 4 is a side view showing another composite flexible indicator;

FIG. 22 is a side view showing still another electric tutor assembled with an acoustic piano; and FIG. 23 is a side view showing yet another electric tutor assembled with an acoustic piano.

DESCRIPTION OF THE PREFERRED EMBODIMENTS

First Embodiment

Figure 1:
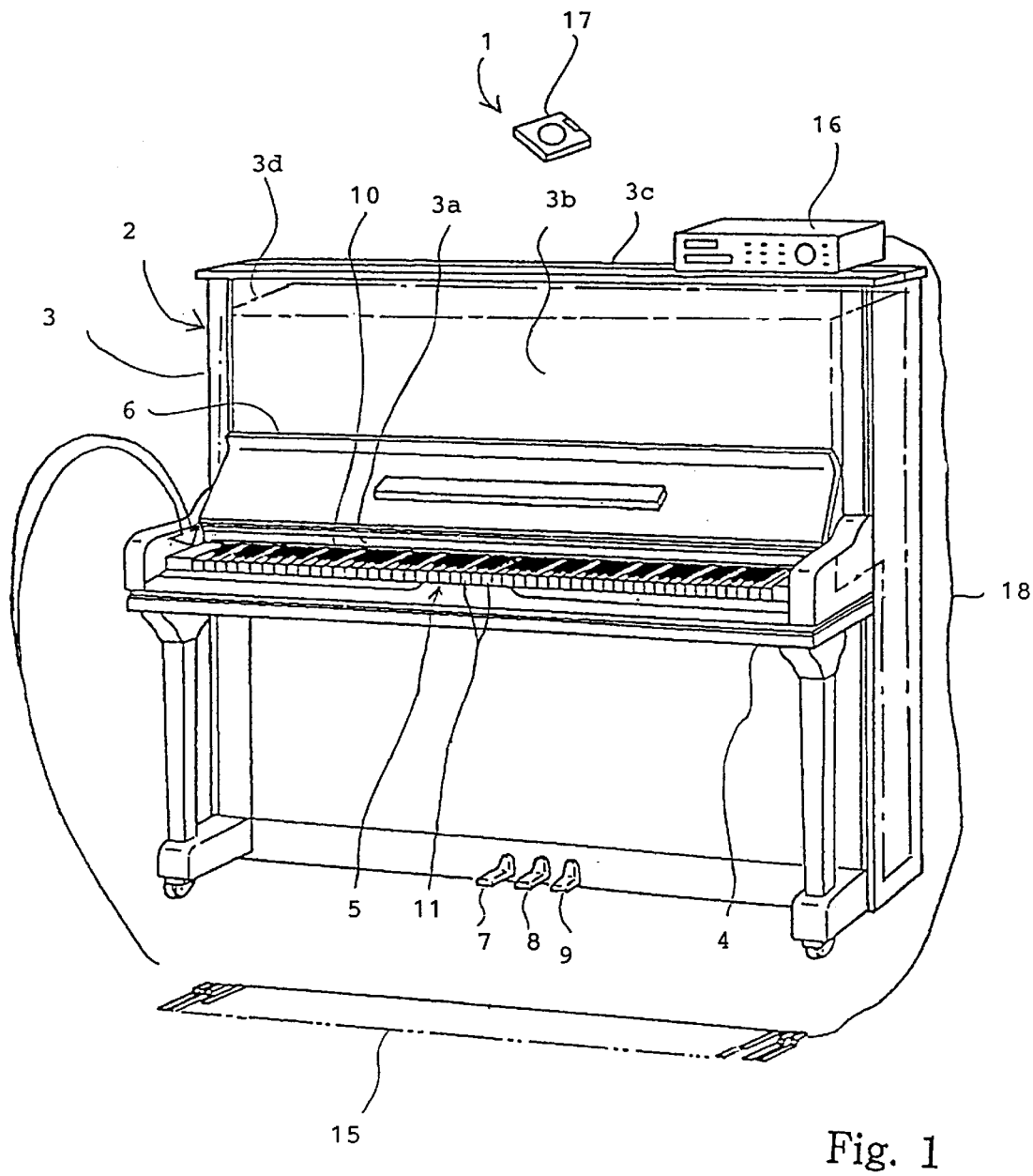
FIG. 1 is a perspective view showing an electric tutor according to the present invention installed in an upright piano.

Referring to FIG. 1 of the drawings, an electric tutor 1 embodying the present invention is provided for an acoustic piano 2. In the following description, word "front" is indicative of a position closer to a player sitting on a chair for playing the acoustic piano 2. The acoustic piano 2 is a standard upright piano, and comprises a piano case 3, a key bed 4 projecting from the piano case 3, a keyboard 5 mounted on the key bed 4, a fall board 6 turnable with respect to the keyboard 5 and three pedals 7/8/9 projecting from the piano case 3. Plural black/white keys 10/11 are arranged in the well-known pattern, and form in combination the keyboard 5. The black/white keys 10/11 are turnable between respective rest positions and respective end positions. The self-weight causes the black/white key 10/11 to stay in the rest position, and a key stop rail 3a does not allow the black/white keys 10/11 to turn over the rest positions. Notes of the scale are assigned to the black/white keys 10/11, respectively. While a pianist is performing a tune, the black/white keys 10/11 are selectively depressed by a player.

Though not shown in FIG. 1, key action mechanisms, hammer assemblies, music strings and damper mechanisms are accommodated in the piano case 3, and are represented by dot-and-dash lines designated by reference 3d. The key action mechanism transfers force from the associated depressed key 10/11 to the hammer assembly for rotating the hammer toward the associated music strings, and the damper mechanism is spaced from the associated music strings before the strike of the music strings. When the hammer strikes the associated music strings, the music strings vibrate so as to generate an acoustic sound. The behavior of those parts is well known to a person skilled in the art, and no further description is incorporated hereinbelow.

The fallboard 6 is turnable between an open position and a closed position. The fallboard 6 shown in FIG. 1 is staying at the open position, and the front end portion of the fall board 6 leans against an upper front board 3b of the piano case 3. The upper front board 3b is continued through an upper sill (not shown) to the key stop rail 3a. While the fall board 6 is in the open position, the key stop rail 3a is under the rear end portion of the fall board 6, and the keyboard 5 is exposed to the player. When the fall board 6 is rotated from the open position, the fall board 6 reaches the closed position, and the keyboard 5 is covered with the fall board 6. The black keys 10 and the white keys 11 are arranged in the well-known pattern, and are rotated between respective rest positions and respective end positions. The black and white keys 10/11 shown in FIG. 1 are staying at the rest positions.

The three pedals 7/8/9 are depressed by a right foot and a left foot of the player, and a depressed pedal 7/8/9 imparts a musical representation to the acoustic sounds. Thus, the acoustic piano 2 is a standard upright piano, and no further description is incorporated hereinbelow.

The electric tutor 1 comprises a composite flexible indicator 15, a controller 16 connected to the composite flexible indicator 15, a floppy disk 17 and a harness 18 for connecting the controller 16 to the composite flexible indicator 15. The harness 18 may extend inside of the piano case 3. The floppy disk 17 stores digital data representative of a series of notes forming a tune. The controller 16 sequentially reads out the pieces of digital data from the floppy disk 17, and generates driving signals. The driving signals are representative of black/white keys 10/11 to be depressed by the player, and are supplied through the harness 18 to the composite flexible indicator 15. The controller 16 is put on a top board 3c of the piano case 3. The composite flexible indicator 15 is as wide as the keyboard 5, and is placed on the keyboard 5.

Figure 2:
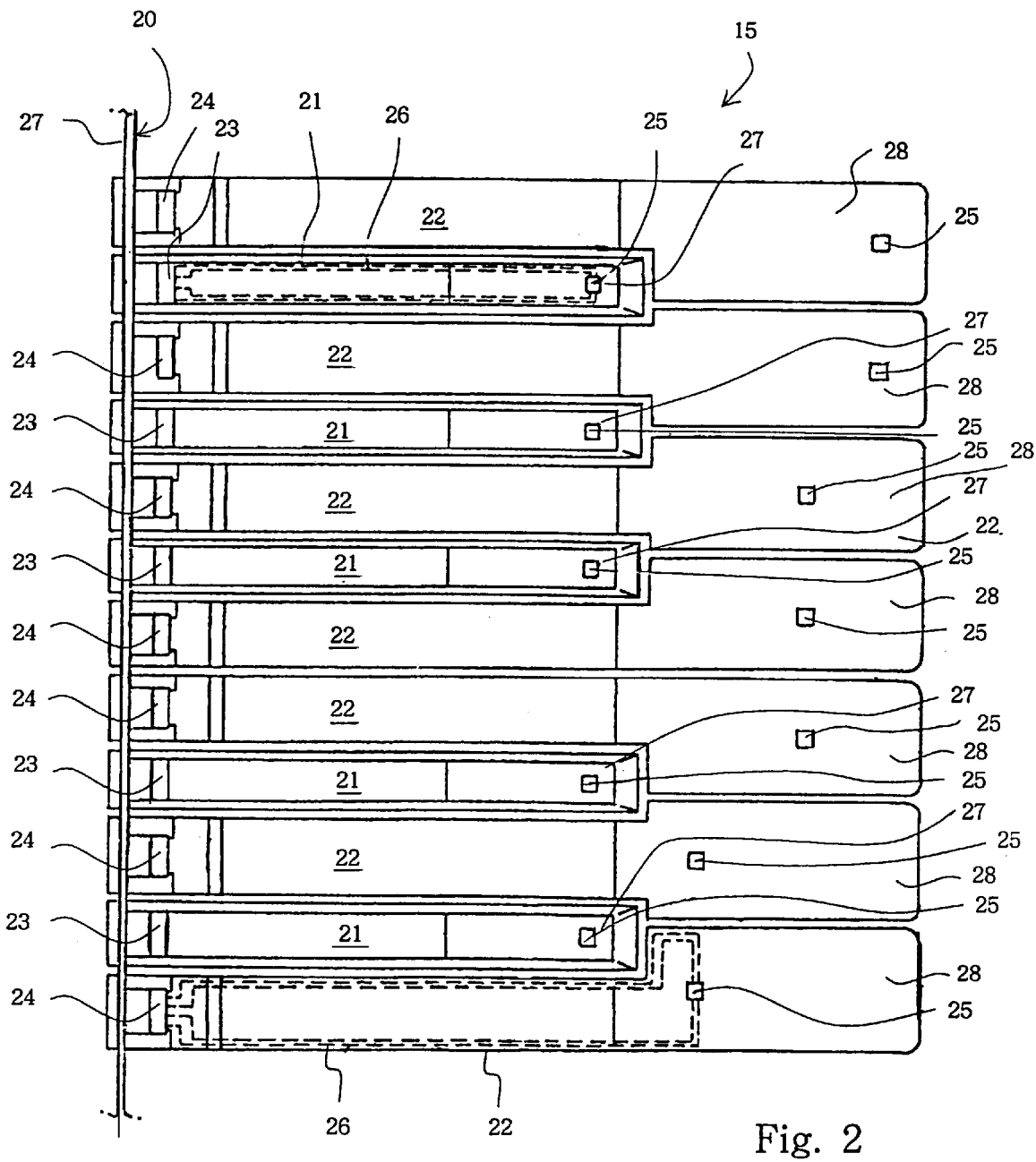
FIG. 2 is a plane view showing a composite flexible indicator.

As will be seen from FIGS. 2 and 3, the composite flexible indicator 15 includes a print board 20, flexible insulating strips 21/22, connectors 23/24 provided between the print board 20 and the rear end portions of the flexible insulating strips 21/22, optical indicators 25 attached to the front end portions of the flexible insulating strips 21/22, signals lines 26 and photo-transmissible cover members 27/28. The flexible insulating strip 21 has a contour similar to that of the upper surface of the associated black key 10, and the flexibly insulating strip 22 has another contour similar to that of the upper surface of the associated white key 11. The flexible insulating strips 21/22 are as long as the associated black/white keys 10/11, and the front ends of the strips 21/22 are substantially aligned with the front ends of the black/white keys 10/11. The composite flexible indicator 15 has a comb-like configuration, and the flexible insulating strips 21/22 are arranged in the pattern of the piano keyboard. The flexible insulating strips 21/22 are formed of synthetic resin such as, for example, polypropylene, polyethylene, polyamide or vinyl chloride, felt or cloth. A flexibly substrate may be available for the flexible insulating strips 21/22.

The signal lines 26 are patterned on the reverse surfaces of the flexible insulating strips 21/22 as indicated by broken lines, and are connected to the associated optical indicators 25. Although the broken lines are drawn on the one flexible insulating strip 21 and one flexible insulating strip 22, the signal lines 26 are formed on the reverse surfaces of all the flexible insulating strips 21/22. The signal lines 26 are so thin that the player does not feel the key touch different. When the force is exerted on the flexible insulating strip 21/22, the signal lines 26 are never short-circuited. The signal lines 26 may be formed through a printing technique. The signal lines 26 may be embedded in the flexible insulating strips 21/22.

The optical indicators 25 are connected to the signal lines 26 on the associated flexible insulating strips 21/22, and are covered with the photo-transmissible cover members 27/28. In this instance, the optical indicator 25 is implemented by a light emitting diode. Alternatively, a liquid crystal display, a small incandescent lamp and a small electron-ray tube are available for the optical indicators 25. The optical indicators 25 are exposed to the surface of the flexible insulating strips 21/22. Otherwise, the optical indicators 25 may be embedded in the flexible insulating strips 21/22. In either case, it is necessary that the player visually recognizes the optical indication. It is desirable for the player that the optical indicators 25 is less than 2 millimeters thick, preferably, than 1 millimeter thick, because the player feels a thick optical indicator obstacle.

The optical indicator 25 may constitute plural segments. In this instance, the driving signal causes the segments to selectively radiate light, or causes the segments to pass the back light. As a result, a character or a symbol is produced on each optical indicator 25.

The photo-transmissible cover members 27/28 are, by way of example, formed of urethane resin or acrylic resin. When a character and/or a symbol is produced on the optical indicator, the photo-transmissible cover members 27/28 are formed of transparent material having transmittance large enough to discriminate the character and/or the symbol. The photo-transmissible cover members 27/28 are equal to or less than 3 millimeters thick. Preferably, the photo-transmissible cover members 27/28 are equal to or less than 2 millimeters thick. A thick photo-transmissible cover members 27/28 is an obstacle against the fingering.

The photo-transmissible cover members 27/28 may be semi-transparent. In this instance, the player hardly discriminates the light source, and feels the photo-transmissible cover members 27/28 dim light source. If a kind of optical diffusing filler is dispersed in the photo-transmissible cover members 27/28, the photo-transmissible cover members 27/28 have appropriate dispersion of illuminance. The optical diffusing filler has different refractive indexes, and a typical example of the optical diffusing filler is spherical silica particles. If the particle size and/or the content of the spherical silica particle is regulated to an appropriate dispersion, the manufacturer can give a target dispersion of illuminance.

The photo-transmissible cover members 27/28 are formed over the optical indicators 25 as follows. Highly viscous material resin is dropped onto a target area of the flexible insulating strip members 21/22, and is spread thereover. Thereafter the highly viscous material resin is solidified, and is formed into the photo-transmissible cover members 27/28.

The manufacturer locates the optical indicators 25 anywhere on the flexible insulating strip 21/22 in so far as the player easily recognizes the optical indication. From this aspect, the front end portion is appropriate. The optical indicators on the keys assigned predetermined notes are grouped, and the optical indicators of the group are arranged on a virtual lateral line different from other virtual lateral lines assigned to other optical indicator groups as shown in FIG. 2. Otherwise, the optical indicators 25 over the black keys 10 and the optical indicators 25 over the white keys 11 may be respectively arranged on two virtual lateral lines parallel to each other. The optical indicators on the keys assigned a certain note such as C are arranged on a virtual lateral line different from virtual lateral lines respectively assigned to other notes. The optical indicators 25 may be grouped by octave. In this instance, the optical indicators of different octaves may be arranged on different virtual lateral lines, respectively.

The print board 20 has a conductive pattern 20a printed on a rigid insulating board 27 (see FIG. 5), and the connectors 23/24 electrically connect the conductive pattern 20a to the signal lines 26. The driving signals are selectively transferred from the conductive pattern 20a through the connectors 23/24 to the signal lines 26. The driving signals are transferred through the signal lines 26 to the optical indicators 25, and cause the optical indicators 25 to radiate the light.

The rigid insulating board 27 is attached to the front surface of the key stop rail 3a, and the connectors 23/24 are arranged on the front surface of the rigid insulating board 27 in a staggered manner as shown in FIG. 3. The connectors 23 are associated with the black keys 10, and the other connectors 24 are associated with the white keys 11. The white key 11 has a wooden member 11a, and the upper/front surfaces of the wooden member 11a are covered with a white layer 11b of ivory or acrylate resin. The black key 10a has a black projection 10a formed of ebony wood or phenol resin. The black projection 10a has an upper surface higher than the white layer 11b. When the rigid insulating board 27 is attached to the key stop rail 3a, the connectors 23 put the flexible insulating strips 21 on the upper surfaces of the black projections 10a, respectively, and the rear end portions of the flexible insulating strips 22 are deformed so as to laminate the front end portions of the flexible insulating strips 22 on the white layers 11b, respectively. Thus, the connectors 23/24 arranged in the staggered manner stably put the flexible insulating strips 21/22 on the black projections 11a and the white layers 11b.

The connectors 23/24 pinch the flexible insulating strips 21/22, and render the flexible insulating strips 21/22 deformed with respect to the print board 20. For this reason, when the black/white keys 10/11 are depressed and, thereafter, released, the flexible insulating strips 21/22 are deformed and moved together with the associated black/white keys 10/11.

The flexible insulating strips 21/22 may have rounded portions 21a/22a as shown in FIG. 4. The rounded portion 21a/22a absorbs the deflection due to the downward motion of the black/white key 10/11, and prevents the rear end portion pinched by the connector 23/24 from breakage due to large bending moment.

Moreover, non-slip layers 29/30 may be attached to the back surfaces of the flexible insulating strips 21/22 as shown in FIG. 4. The non-slip layers 29/30 are formed of rubber, viscous material or adhesive material. The non-slip layers 29/30 force the flexible insulating strips 21/22 to follow the black/white keys 10/11, and prevent the flexible insulating strips 21/22 from separation from the black projections 10a and the white layers 11b. It is desirable that the non-slip layers 29/30 are repeatedly adhered to and peeled from the keys 10/11. The non-slip layers 29/30 may be replaced with cushions. The cushions may be formed of felt, cloth or rubber. When a player depresses the flexible insulating strips 21/22, the cushions absorb noise. Rubber sheets may serve as not only the non-slip layer but also the cushion.

Figure 5:
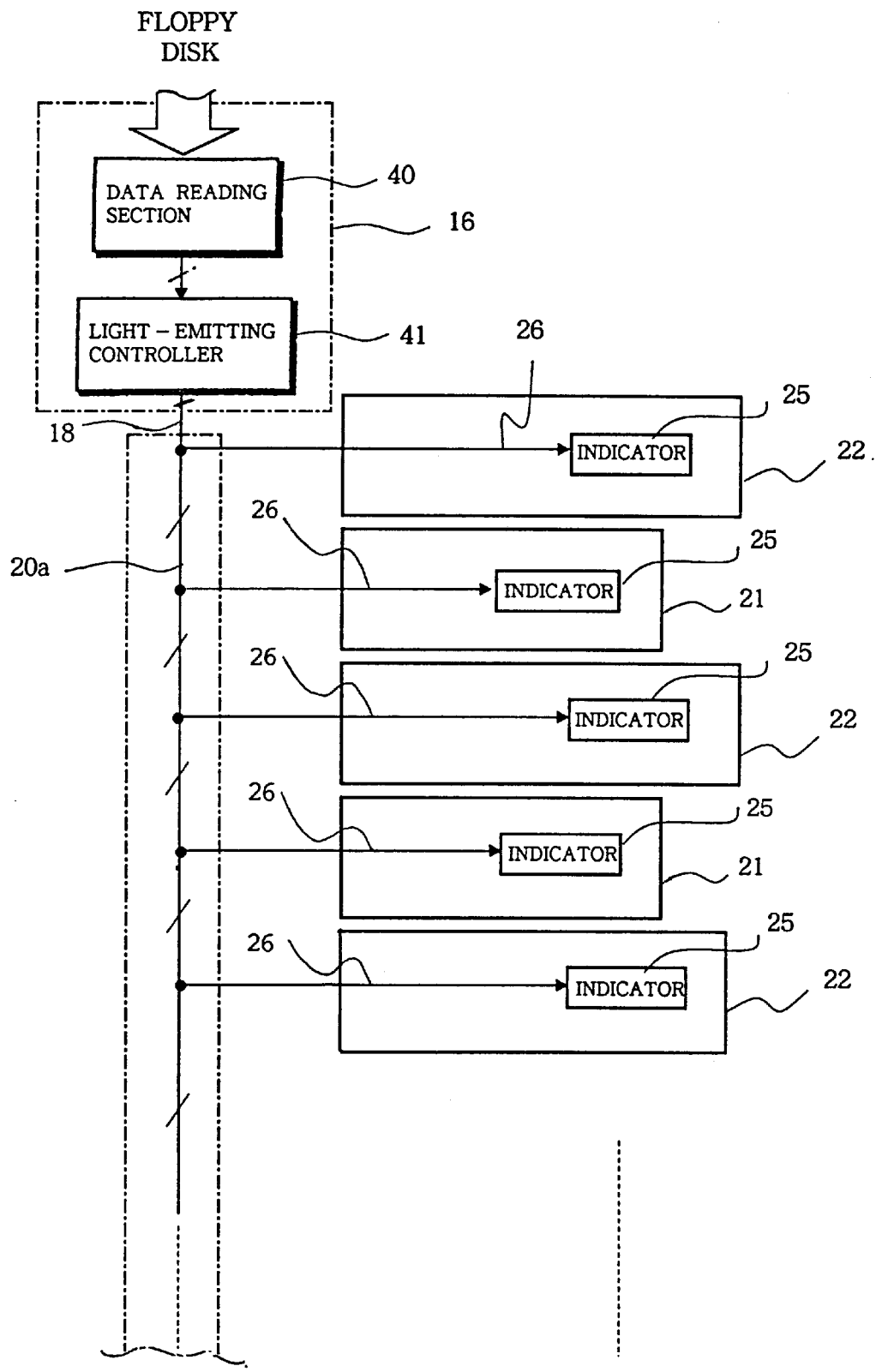
FIG. 5 is a block diagram showing the arrangement of the electric tutor.

Turning to FIG. 5, the controller 16 includes a data reading section 40 and a light-emitting controller 41. The floppy disk 17 is inserted into a slot (not shown) formed in the data reading section 40, and the data reading section 40 sequentially reads out the series of digital codes representative of a tune. The series of digital codes contains not only pieces of music data information for notes but also pieces of music data information for sound strength and other musical expression.

The music data codes are supplied from the data reading section 40 to the light-emitting controller 41 at appropriate timings, and the light emitting controller 41 produces the driving signals from the music data codes. The light-emitting controller 41 regulates each of the driving signals to one of the active levels corresponding to the sound intensity, and maintains it to the active level while the music score is instructing the player to depress the associated key 10/11. The light emitting controller 41 selectively supplies the driving signals through the harness 18, the conductive pattern 20a, the connectors 23/24 and the signal lines 26 to the optical indicators 25, and the driving signals cause the optical indicators 25 to radiate the light. The optical indicators 25 radiate the light at light intensity corresponding to the active level, and inform the player of the black/white keys to be depressed and the magnitude of force to be exerted on the keys. When the score requests the player to product a piano sound at pianissimo, the optical indicator 25 radiates the weakest light. On the other hand, when the score requests the player to produce a piano sound at fortissimo, the optical indicator maximizes the light intensity. Of course, when the score requests the player to produce a chord, the light emitting controller 41 concurrently supplies the driving signals to the optical indicators 25. Thus, the electric tutor guides the fingers of the player along the score, and the player repeatedly practices a tune without a human teacher.

As will be understood from the foregoing description, the flexible insulating strips 21/22 follow the motions of the association keys 10/11 without substantial resistance against the fingers, and the player feels the key touch usual. Moreover, the flexible insulating strips 21/22 keep the optical indicators 25 on the upper surfaces of the black/white keys 10/11 at all times. The optical indicators 25 guide the fingers of the player in accordance with the music score, and the player practices the tune without a human tutor.

Additionally, the flexible insulating strips 21/22 are connected to the rigid printed board 20 by means of the connectors 23/24, and the player is only required to connect the rigid printed board 20 to the key stop rail 3a. Thus, the player easily installs the electric tutor over the keyboard 5, and removes it from the acoustic piano 1.

The flexible insulating strips 21/22 are independently connected to the connectors 23/24, and the deformation of a flexible insulating strip 21/22 does not affect the adjacent flexible insulating strips 21/22. For this reason, even though the composite flexible indicator 15 is placed over the keyboard 5, the composite flexible indicator 15 does not unintentionally produces a piano sound.

The staggered arrangement of the connectors 23/24 makes the deformation of the associated flexible insulating strips small at the rest position, and the flexible insulating strips closely lie on the upper surfaces of the black/white keys 10/11.

In the first embodiment, the key action mechanisms, the damper mechanisms, the hammer assemblies and the sets of strings as a whole constitute a sound generating means, and the controller 16, the harness 18, the conductive pattern 20a and the signal lines 26 as a whole constitute a driving signal supplying means.

Second Embodiment

Figure 6:
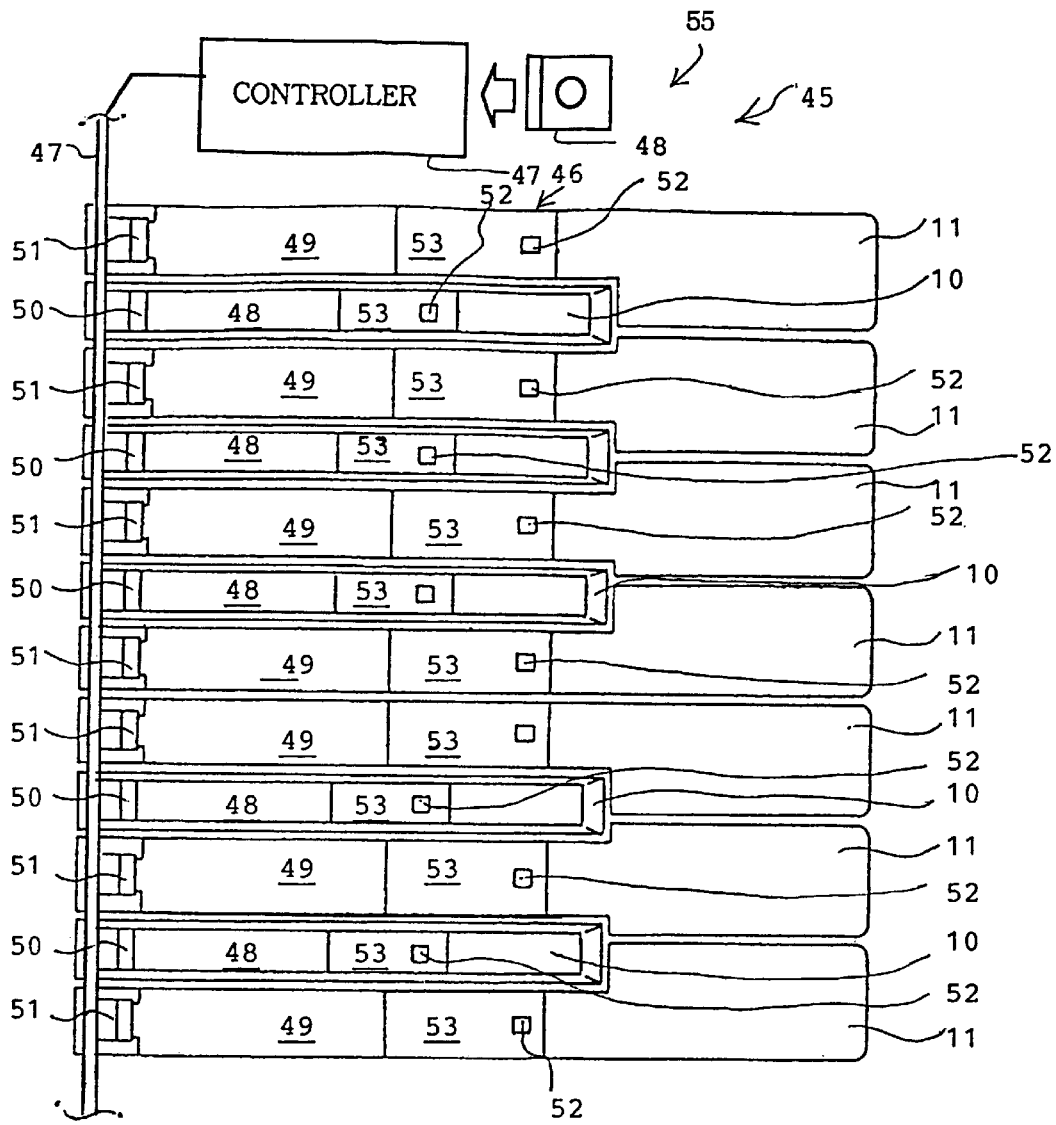
FIG. 6 is a plane view showing a composite flexible indicator incorporated in another electric tutor according to the present invention.
Figure 7:
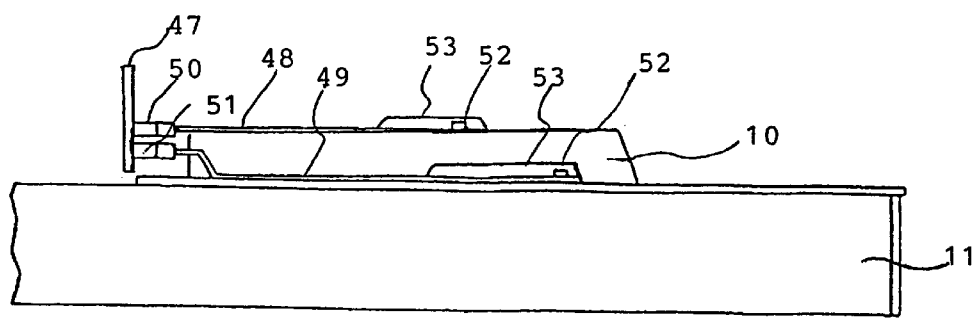
FIG. 7 is a side view showing the composite flexible indicator placed on a keyboard of an acoustic piano.

Turning to FIGS. 6 and 7 of the drawings, another electric tutor 45 is associated with an acoustic piano like the upright piano 2, and the acoustic piano is not detailed hereinbelow for the sake of simplicity. The components of the acoustic piano are designated by the same references as those of the upright piano 2 in the following description.

The electric tutor 45 comprises a composite flexible indicator 46, a controller 47 connected to the flexible indicator 46 and an information storage medium such as a floppy disk 48 insertable into the controller 47. The floppy disk 48 stores a series of digital data codes representative of a tune, and the controller 47 sequentially reads out the digital data codes from the floppy disk 48 for producing driving signals. The driving signals are supplied to the composite flexible indicators 46.

The composite flexible indicator 46 includes a rigid printed board 47, flexible insulating strips 48/49 connected through connectors 50/51 to the rigid printed board 47, signal lines (not shown) printed on the reverse surfaces of the flexible insulating strips 48/49, optical indicators 52 attached to the flexible insulating strips 48/49 and photo-transmissible cover members 53 covering the optical indicators 52. The rigid printed board 47, the connectors 50/51, the signal lines, the optical indicators 53 and the photo-transmissible cover members 53 are similar to those of the first embodiment, and no further description is incorporated hereinbelow.

When the rigid printed board 47 is attached to the key stop rail 3a (not shown in FIGS. 6 and 7), the flexible insulating strips 48/49 are placed on the black/white keys 10/11, respectively. A different from the flexible insulating strips 21/22 are length. The flexible insulating strips 48/49 are shorter than the flexible insulating strips 21/22, and expose the front end portions of the black/white keys 10/11 to a player. The player directly depresses the black/white keys 10/11 with the fingers, and the player feels the usual touch on the black/white keys 10/11. In this view, the insulating strips 21/22 may not be flexible.

The optical indicators 52 radiate light so as to indicate the keys 10/11 to be depressed, and the player practices the fingering for the tune on the key board 5.

Third Embodiment

Figure 8:
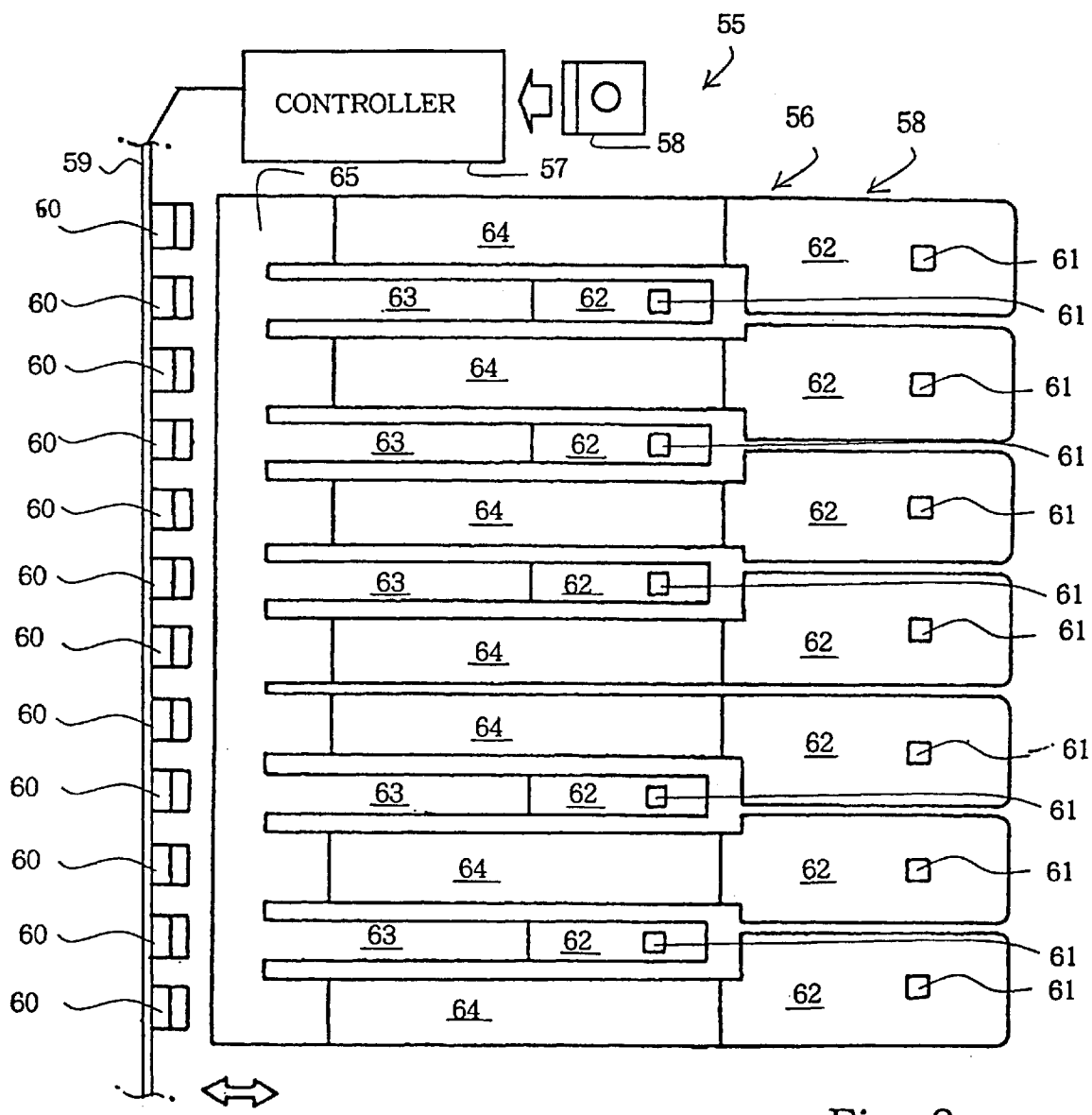
FIG. 8 is a plane view showing a flexible indicator block incorporated in yet another electric tutor according to the present invention.
Figure 9:
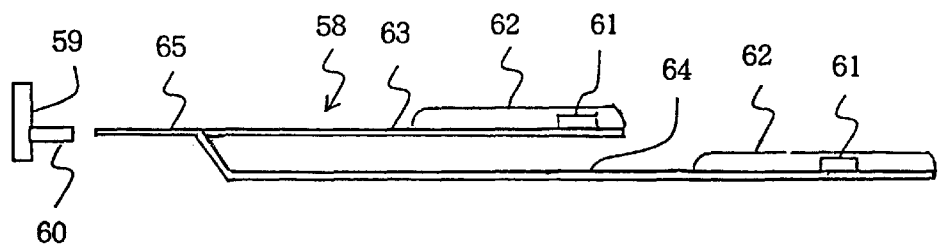
FIG. 9 is a side view showing the flexible indicator block placed on a keyboard of an acoustic piano.

Turning to FIGS. 8 and 9 of the drawings, another electric tutor 55 is associated with an acoustic piano like the upright piano 2, and the acoustic piano is not detailed hereinbelow for the sake of simplicity. The components of the acoustic piano are designated by the same references as those of the upright piano 2 in the following description.

The electric tutor 55 comprises a composite flexible indicator 56, a controller 57 connected to the flexible indicator 56 and an information storage medium such as a floppy disk 58 insertable into the controller 57. The floppy disk 58 stores a series of digital data codes representative of a tune, and the controller 57 sequentially reads out the digital data codes from the floppy disk 58 for producing driving signals. The driving signals are supplied to the composite flexible indicators 56.

Plural flexible indicator blocks 59 for m parts of the composite flexible indicator 56, and is associated with black/white keys 10/11 assigned an octave. Other flexible indicator blocks 59 are associated with other octaves, respectively. Although the composite flexible indicator 56 further includes a rigid printed board 59, connectors 60, signal lines (not shown), optical indicators 61 and photo-transmissible cover members 62, these component members are similar to those of the first embodiment, and description is focused on the flexible indicator blocks 59 for the sake of simplicity. The flexible indicator blocks 59 are similar to one another, and description is made on the flexible indicator block 59 shown in FIG. 8, only. The flexible indicator block 58

The flexible indicator block 59 has plural finger portions 63/64 associated with the black/white keys 10/11 and a connecting portion 65 integral with the finger portions 63/64. In other words, the finger portions 63/64 are branched from the connecting portion 65. The connecting portion 65 is pinched by the connectors 60, and the signal lines are electrically connected to the conductive pattern of the rigid printed board 59. The fingers 63/64 are as long as the black/white keys 10/11, and the front ends of the fingers 63/64 are aligned with the front ends of the black/white keys 10/11, respectively. The optical indicators 61 are attached to the front end portions of the fingers 63/64, and are covered with the photo-transmissible cover members 62.

When the rigid printed board 59 is attached to the key stop rail (not shown in FIGS. 8 and 9), the fingers 63/64 are placed on the black/white keys 10/11, and are independently deformed together with the black/white keys 10/11. Even though the fingers 63/64 are integral with the connecting portion 65, the deformation of a finger 63/64 does not affect the adjacent fingers 63/64, and, accordingly, the adjacent black/white key 10/11 does not unintentionally generate the sound. The white keys 11 are located under the black keys 10, and, for this reason, the fingers 64 are twice bent so as to be closely laminated on the white keys 11 (see FIG. 9).

The flexible indicator blocks 58 are easy for assemblage. The player can easily assemble the flexible indicator blocks 58 and disassemble them from the rigid printed board 59. When a player requires the electric tutor 55, the player assembles the flexible indicator blocks 58 with the rigid printed board 59 by inserting the flexible indicator blocks 58 into the connectors 60, and practices the fingering on the keyboard under the guidance of the electric tutor 55. However, if a player does not need the guidance, the player disassembles the flexible indicator blocks 58 from the rigid printed board 59, and plays a tune on the keyboard 5.

In this instance, the connectors 60 are arranged on the same level, and the fingers 64 are twice bent. The connectors 60 may be arranged in the staggered manner so as to decrease the step formed therein. The connectors 60 may be deformed by the self-weight, and is naturally laminated on the white keys 11. The fingers 63/64 may form the rounded portions shown in FIG. 4.

Figure 10:
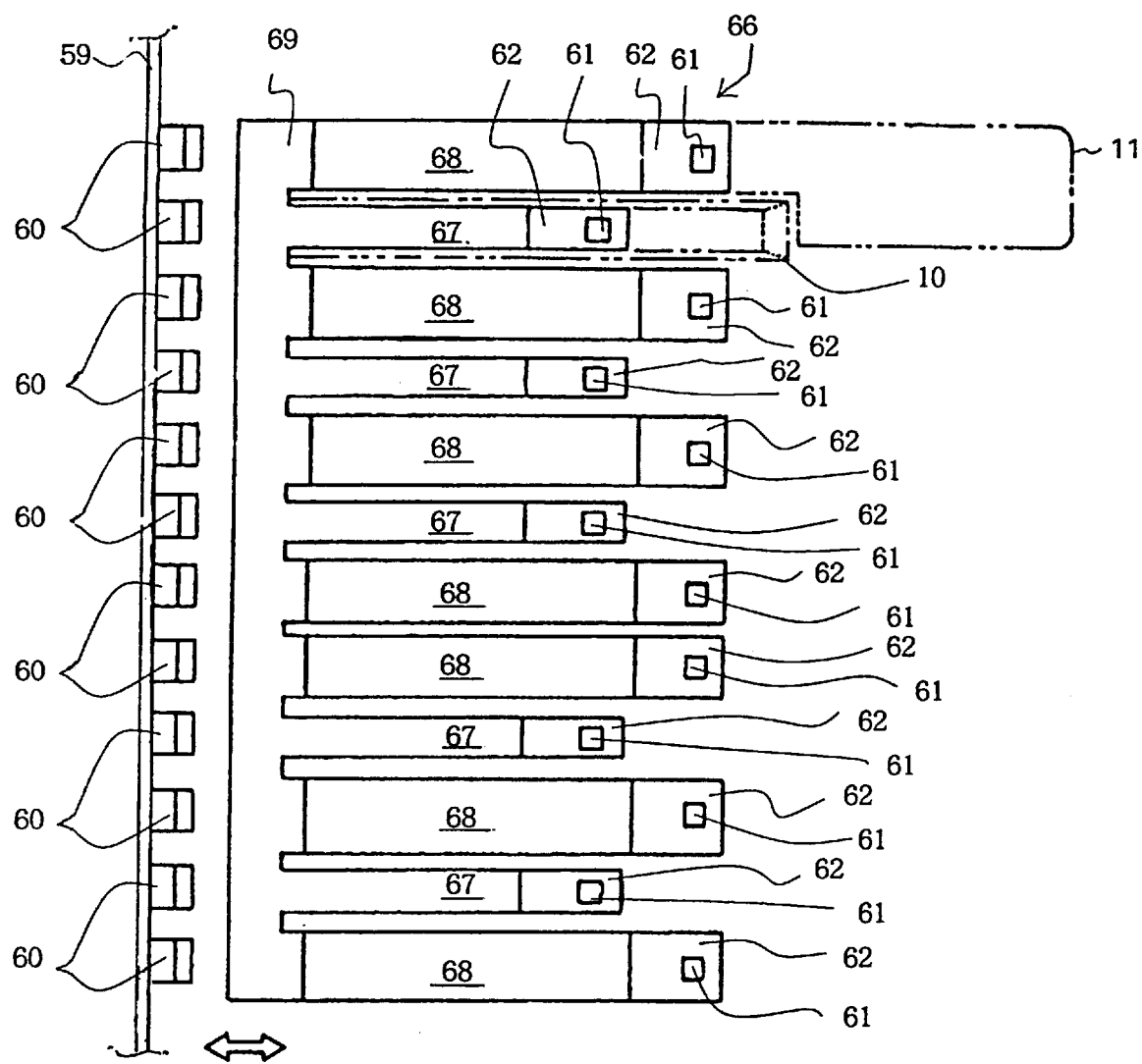
FIG. 10 is a plane view showing another flexible indicator block.
Figure 11:
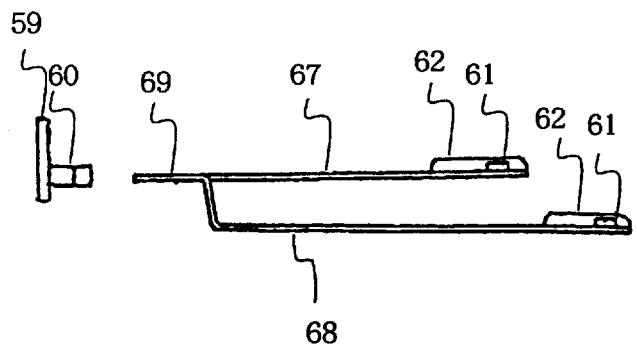
FIG. 11 is a side view showing the flexible indicator block showing FIG. 10.

The flexible indicator block 58 may be modified as shown in FIG. 10/11. Reference numeral 66 designates another indicator block, and fingers 67/68 are branched from a connecting portion 69. The indicator block 66 is assigned to 12 keys for an octave, and forms a composite indicator together with other indicator blocks 66. The fingers 63/64 are shorter than the black/white keys 10/11, and expose the front end portions of the to the player as shown in FIGS. 10 and 11. The indicator block 66 allows the black/white keys 10/11 to give the usual touch to the player.

Fourth Embodiment

Figure 12:
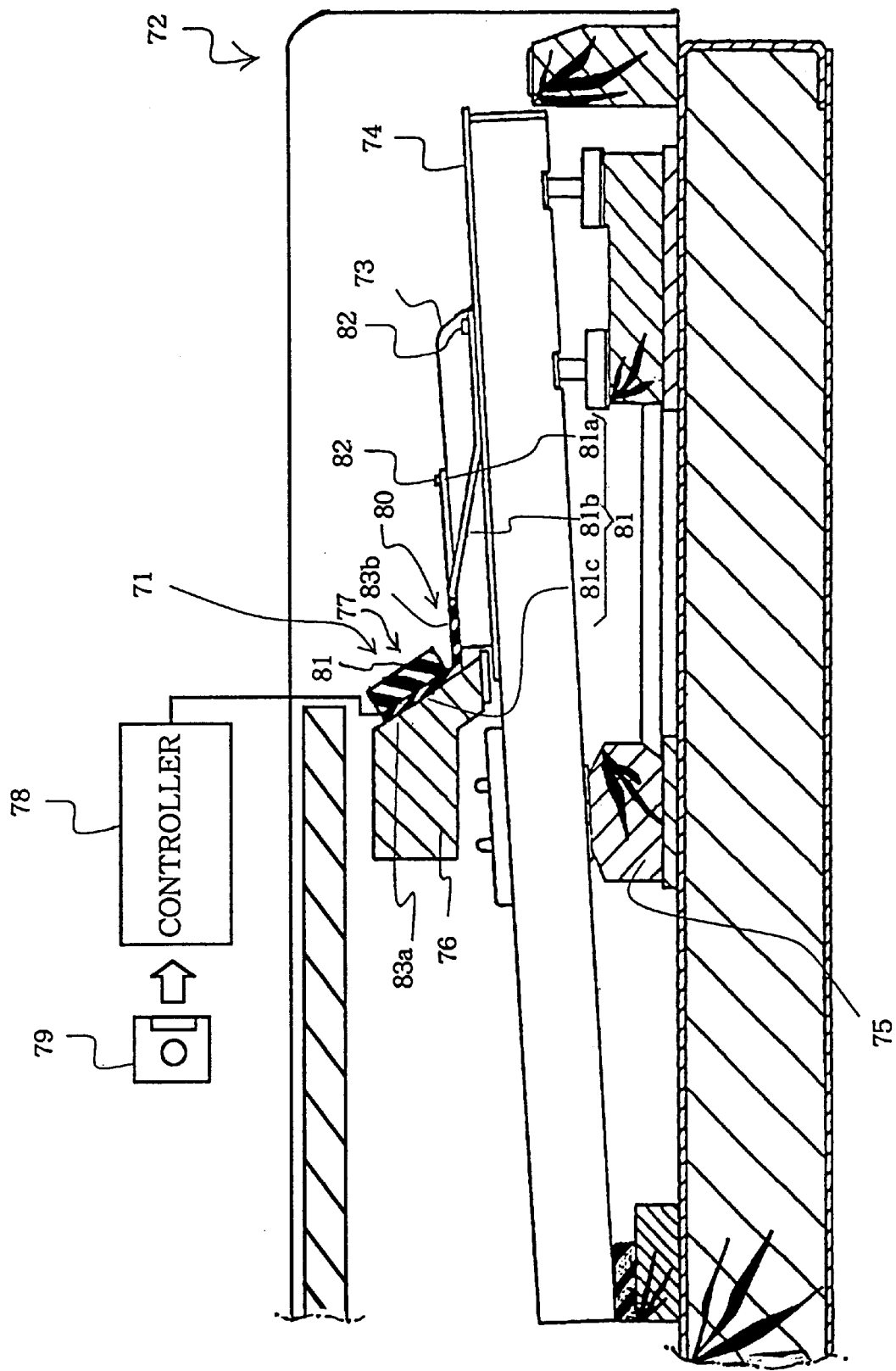
FIG. 12 is a cross sectional view showing an electric tutor assembled with an acoustic piano according to the present invention.
Figure 13:
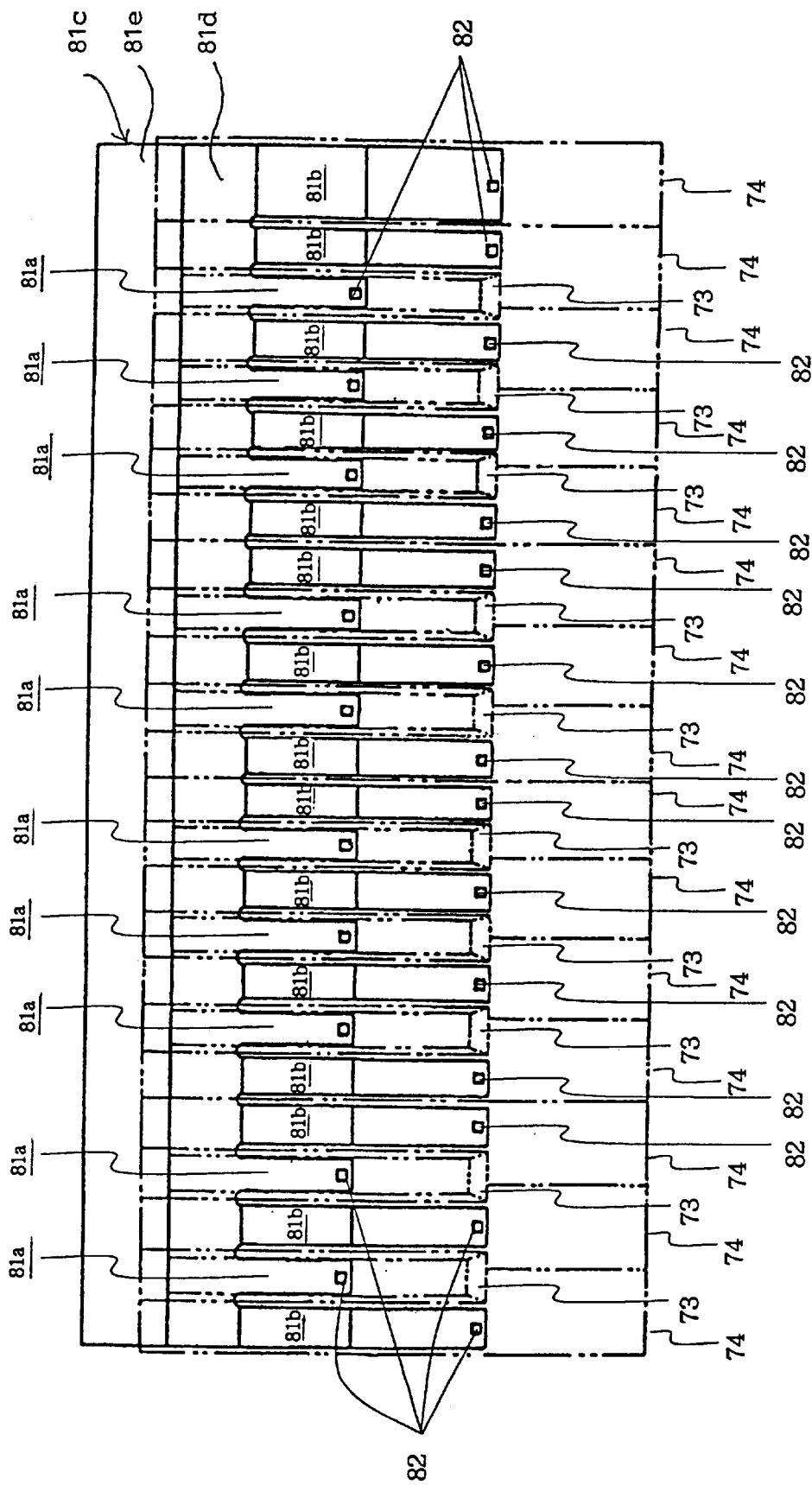
FIG. 13 is a plane view showing a composite flexible indicator placed on a keyboard.

FIGS. 12 and 13 illustrate still another electric tutor 71 installed in an acoustic piano 72. Black/ white keys 73/74 are staying at respective rest positions. The black/white keys 73/74 are turnable with respect to a balance rail 75. A frame 76 laterally extends over the black/white keys 73/74.

The electric tutor 71 includes a composite flexible indicator 77, a controller 78 connected to the composite flexible indicator 77 and an information storage medium such as a floppy disk 79. The controller 78 and the floppy disk 79 are similar to those of the first embodiment.

The composite flexible indicator 76 includes plural flexible indicator blocks 80, fastening means (not shown) and a rigid board 81. The fastening means is, by way of example, implemented by bolts or an adhesive tape, and fixes the flexible indicator blocks 80 and the rigid board 81 to the frame 76. The bolts are screwed into the frame 76 at intervals, and press the flexible indicator blocks 80 against the frame 80 and the rigid board 81 against the flexible indicator blocks 80. The adhesive tape is repeatedly used for fixing the flexible indicator blocks 80 and the rigid board 81 to the frame 80, and a Velcro (trademark) is an example of such a repeatedly usable adhesive tape.

The flexible indicator block 80 is assigned to black/white keys 73/74, and includes flexible insulating sheet 81, signal lines (not shown) printed on the flexible insulating sheet 81 and optical indicators 82 connected to the signal lines. The flexible insulating sheet 81 is broken down into fingers 81a/81b and a connecting portion 81c. The fingers 81a/81b are branched from the connecting portion 81c, and are respectively associated with the black/white keys 73/74, respectively.

The connecting portion 81c has a rear sub-portion 81d pressed against the frame 76 and a front sub-portion 81e bent from the rear sub-portion 81d. The signal lines extends from the rear sub-portion 81d through the front sub-portion into the fingers 81a/81b. A conductive pattern is formed on the back surface of the rigid board 81, and is held in contact with the signal lines in the rear sub-portion 81c. Accordingly, the driving signals are supplied from the controller 78 to the conductive pattern on the back surface of the rigid board 81, and are selectively supplied from the conductive pattern through the signal lines to the optical indicators 82. Thus, the electric tutor 72 implementing the fourth embodiment directly supplies the driving signals from the conductive pattern to the signal lines, and a connector is not required for the signal distribution.

The fingers 81a/ 81b are shorter than the black/white keys 73/74, and expose the front end portions of the black/white keys 73/74 to a player. Although the optical indicators 82 are attached to the front end portions of the fingers 81a/81b, the player does not press the optical indicators 82 with the fingers, and, for this reason, the optical indicators 82 are not covered with any photo-transmissible cover members. If the manufacturer wants to protect the optical indicators 82 from damages, the optical indicators 82 are covered with photo-transmissible cover members.

Thus, the connectors and the photo-transmissible cover members are unnecessary for the optical tutor 72, and the manufacturer reduces the production cost rather than the first to third embodiments. Of course, the controller 78 selectively supplies the driving signal to the optical indicators 82, and a player practices a tune under the guidance of the optical indicators 82.

The rigid board 81 and the flexible indicator blocks 80 may be changed to each other. Namely, the rigid board 81 is pressed against the frame 76, and the indicator blocks 80 are pressed against the rigid board 81.

Fifth Embodiment

Figure 14:
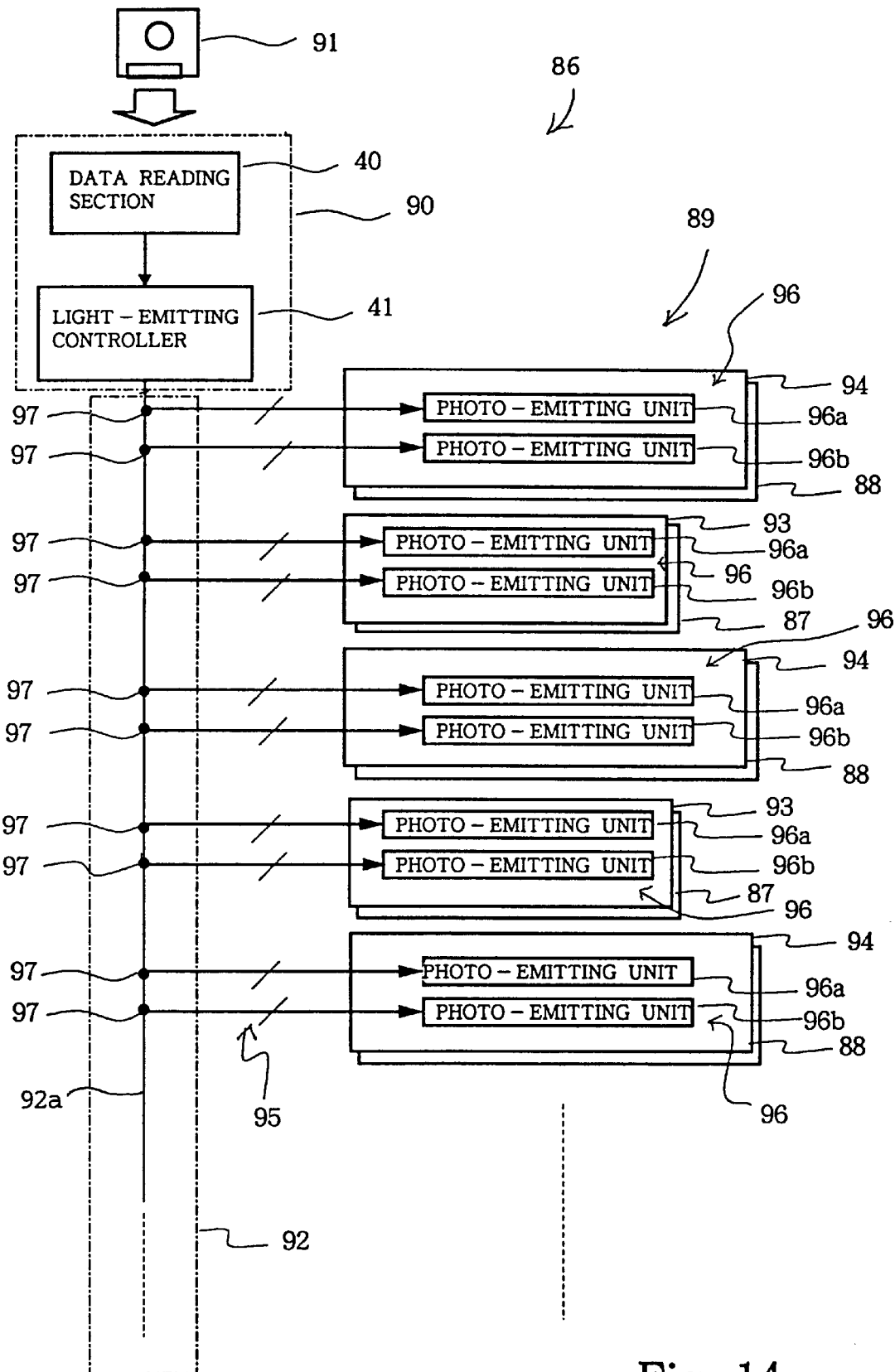
FIG. 14 is a block diagram showing the circuit arrangement of an electric tutor according to the present invention.

Turning to FIG. 14 of the drawings, another electric tutor 86 embodying the present invention is placed on black/white keys 87/88 of an acoustic piano. The electric tutor 86 also largely comprises a composite flexible indicator 89, a controller 90 and an information storage medium such as a floppy disk 91. The controller 90 and the floppy disk 91 are similar to those of the first embodiment, and no further description is incorporated hereinbelow.

The composite flexible indicator 89 includes a rigid printed board 92, flexible insulating strips 93/94, plural sets of signal lines 95 printed on the flexible insulating strips 93/94, respectively, plural sets of photo-emitting units 96 attached to the flexible insulating strips 93/94, respectively, and connectors 97 provided between the rigid printed board 92 and the flexible insulating strips 93/94. A conductive pattern 92a is formed on the rigid printed board 92, and the connectors 97 electrically connect the conductive pattern 92a to the sets of signal lines 95, respectively. Thus, the connectors 97 not only physically connect the flexible insulating strips 93/94 to the rigid printed board 92, but also electrically couple the sets of signal lines 95 to the conductive pattern 92a. The flexible insulating strips 93/94 may be replaced with the flexible insulating sheets, and the rigid printed board 92 and the connectors 97 may be replaced with the rigid board 81.

The plural sets of photo-emitting units 96 serve as optical indicators, respectively, and each set of photo-emitting unit 96 has two photo-emitting units 96a/96b. The photo-emitting units 96a radiate light in a certain color, and the photo-emitting units 96b radiate light in another color different from that of the photo-emitting units 96a.

The controller 90 specifies the destination of the driving signal. If the controller 90 supplies the driving signal to the photo-emitting unit 96a, the optical indicator 96 radiates the light in the certain color. On the other hand, when the controller 90 supplies the driving signal to the other photo-emitting unit 96b, the optical indicator 96 radiates the light in the other color. Thus, the controller 90 selectively energizes the photo-emitting units 96a/96b of each optical indicator 96. The set of photo-emitting unit 96 or the optical indicator may be implemented by a multi-color light emitting diode unit.

As described hereinbefore, the controller 90 selectively supplies the driving signal to the photo-emitting units 96a/96b. If the set of photo-emitting unit can selectively radiate blue light, yellow light and red light, the controller 90 indicates not only the key to be depressed but also the sound intensity. If the music score requests the player to depress a key at pianissimo, the controller 90 renders the photo-emitting diode radiating the blue light. On the other hand, the music score requests the player to depress the key at mezzo forte or fortissimo, the controller 90 causes the photo-emitting diode to radiate the yellow right or the red light.

Otherwise, the controller 90 instructs a player to depress the keys with a finger of either hand. When a key 87/88 is to be depressed by a finger of the left hand, the controller 90 supplies the driving signal to the photo-emitting unit 96a of the associated optical indicator 96. On the other hand, if the key 87/88 is to be depressed by a finger of the right hand, the controller 90 renders the other photo-emitting unit 96b radiating the light.

Moreover, when the optical indicator 96 is implemented by more than two photo-emitting diodes, the controller 90 may informs the player of a finger to be used. The controller 90 may inform the player of a lapse of time to maintain a sound by selecting the color of light radiated from the optical indicator 96. The controller 90 may change the color of light radiated from the optical indicator 96 from a color to another color in order to indicate a preparatory period for depressing a key, a period for keeping the key depressed, a preparatory period for releasing the key and a period for releasing the key. Thus, the controller 90 can inform the player of various kinds of information by changing the color of the light radiated from the optical indicators 96.

First Example of Control Sequence

Figure 15:
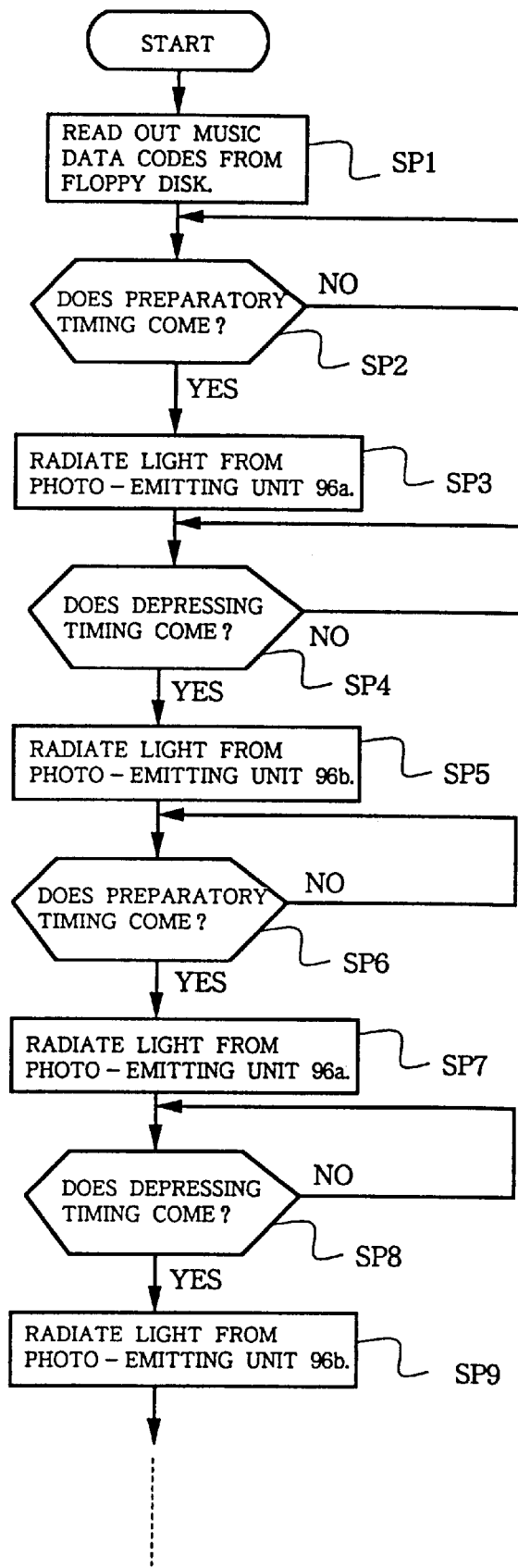
FIG. 15 is a flowchart showing a control sequence executed by a controller incorporated in the electric tutor shown in FIG. 14.

FIG. 15 illustrates a control sequence executed by the controller 90. The controller 90 informs a player of a timing of depressing each key by changing the color of light. The controller 90 causes the first photo-emitting unit 96a to radiate the light in order to preliminarily inform the player of a key or keys to be depressed. When it comes time to depress the key, the controller 90 supplies the driving signal to the other photo-emitting unit 96b, and the photo-emitting unit 96b radiates the light in different color. The timing for radiating the light from the photo-emitting unit 96a is hereinbelow referred to as "preparatory timing", and the timing for radiating the light from the other photo-emitting unit 96b is referred to as "depressing timing". A timing for releasing the key is referred to as "releasing timing". The lapse of time between the preparatory timing and the depressing timing is 0.3 second to 1.0 second. The player may change the lapse of time on a manipulating board of the controller 90.

When the floppy disk 91 is inserted into the data reading section 40, the data reading section 40 reads out the music data codes representative of a tune from the floppy disk 91 as by step S1. The tune is written in a music score, and the music score is placed in front of a player. The music data codes may be stored in an internal memory of the controller 90, and the controller 90 starts to increment a timer.

The controller 90 searches the internal memory for a black/white key or keys 87/88 to be firstly depressed, and determines the preparatory timing and the depressing timing for the black/white key or keys 87/88 to be firstly depressed. The controller 90 periodically checks the timer to see whether or not the preparatory time comes as by step SP2. While the current time is getting close and close to the preparatory timing, the answer at step SP2 is given negative, and the controller 90 waits for the preparatory timing.

When the preparatory timing comes, the answer at step SP2 is given affirmative, and the controller 90 supplies the driving signal to the photo-emitting unit 96a associated with a black/white key 87/88 to be depressed as by step SP3. The photo-emitting unit 96a radiates the light for a short while, and the player notices the black/white key to be depressed. The player moves a finger to the black/white key 87/88 so as to be made ready for depressing the black/white key 87/88.

The controller 90 periodically checks the timer to see whether or not the depressing timing comes as by step SP4. While the time is getting closer and closer to the depressing timing, the answer at step SP4 is given negative, and the controller 90 waits for the depressing timing.

When the depressing timing comes, the answer at step SP4 is given affirmative, and the photo-emitting unit 96b radiates the light as by step SP5. The player starts to depress the black/white key 87/88. The photo-emitting unit 96b continuously radiates the light until the releasing timing. When the releasing timing comes, the controller 90 extinguishes the light at the photo-emitting unit 96b. Then, the player releases the black/white key 87/88.

The controller 90 searches the internal memory for the next black/white key or keys 87/88 to be depressed, and determines the preparatory timing and the depressing timing for the next black/white key or keys 87/88.

The controller 90 periodically checks the timer to see whether or not the preparatory timing comes as by step SP6. While the time is getting closer and closer to the preparatory timing for the next black/white key or keys 87/88, the answer at step SP6 is given negative, and the controller 90 waits for the preparatory timing for the next black/white key or keys 87/88.

When the preparatory timing comes, the controller 90 supplies the driving signal to the photo-emitting unit or units 96a associated with the next black/white key or keys 87/88, and the photo-emitting unit or units 96a radiates the light for a short while as by step SP7. Thus, the photo-emitting unit or units 96a inform the player of the next black/white key or keys 87/88 to be depressed, and the player moves fingers to the next black/white key or keys 87/88.

The controller 90 periodically checks the timer to see whether or not the depressing timing for the next key or keys 87/88 comes as by step SP8. While the time is getting closer and closer to the depressing timing, the answer at step SP8 is given negative, and the controller 90 waits for the depressing timing.

When the depressing timing comes, the answer at step SP8 is given affirmative, and the controller 90 supplies the driving signal to the photo-emitting unit or units 96b associated with the next black/white key or keys 87/88. Then, the photo-emitting unit or units 96b radiate the light, and cause the player to notice the depressing timing. The player depresses the next black/white key or keys 87/88. If the player depresses a single black/white key 87/88, a single acoustic sound is produced. On the other hand, if the player depresses plural black/white keys 87/88, a chord is produced. The photo-emitting unit or units 96b continuously radiate the light. When the releasing timing comes, the controller 90 extinguishes the light from the photo-emitting unit or units 96b. In this way, the controller 90 guides the fingers of the player until the last tone or tones on the tune.

In the above described control sequence, the controller 90 instructs the photo-emitting units 96a to radiate the light for a short while. However, another control sequence renders the controller 90 instructing the photo-emitting units 96a to radiate the light as long as the photo-emitting units 96b. This means that the controller 90 extinguishes the light from the photo-emitting units 96b immediately before the releasing timing. Thus, the controller 90 previously informs the player of the releasing timing for the presently depressed key or keys 87/88.

Second Example of Control Sequence

Figure 16:
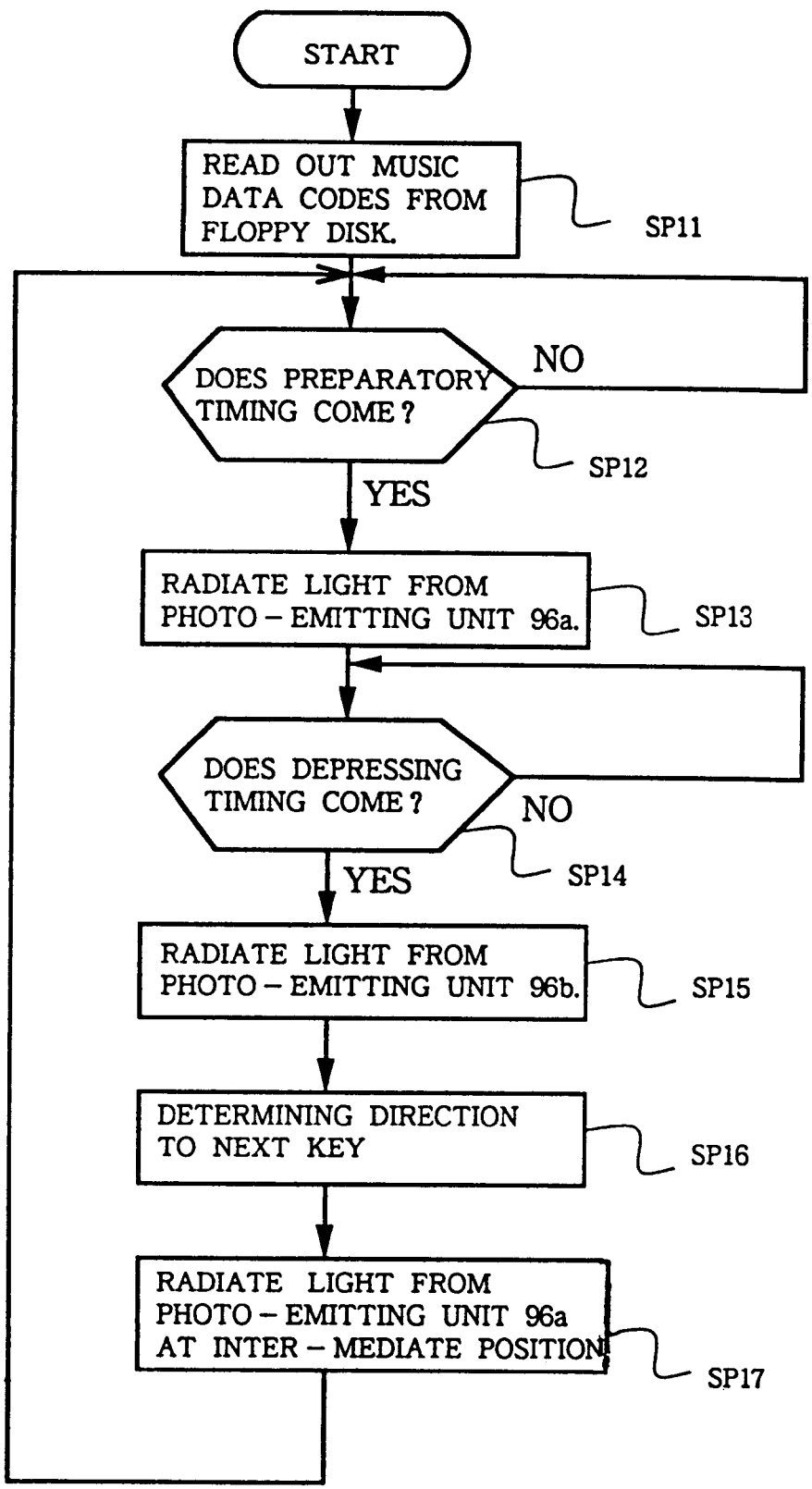
FIG. 16 is a flowchart showing another control sequence executed by a controller incorporated in the electric tutor.

FIG. 16 illustrates another control sequence executed by the controller 90. The controller 90 informs a player of a direction to move the hands for depressing the next black/white key or keys 87/88 through the control sequence.

When a player inserts the floppy disk 91 into the data reading section 40, the data reading section 40 reads out music data codes representative of a tune as by step SP11. The tune is written in a music score, and the music score is put in front of the player. The music data codes are stored in the internal memory of the controller 90, and the controller 90 starts the timer to increment time.

The controller 90 searches the internal memory for a black/white key or keys 87/88 to be firstly depressed, and determines the preparatory timing and the depressing timing for the black/white key or keys 87/88. The controller 90 periodically checks the timer to see whether or not the preparatory timing for the first key or keys 87/88 comes as by step SP12. While the time is getting closer and closer to the preparatory timing, the answer at step SP12 is given negative, and the controller 90 waits for the preparatory timing.

When the preparatory timing comes, the answer at step SP12 is given affirmative, and the controller 90 supplies the driving signal to the photo-emitting unit or units 96a associated with the black/white key or keys 87/88 to be depressed. The photo-emitting unit or units 96a radiate the light for a short while as by step SP13, and previously inform the player of the black/white keys 87/88 to be depressed. The player moves a finger or fingers to the black/white key or keys 87/88.

The controller 90 periodically checks the timer to see whether or not the depressing timing comes as by step SP14. While the time is getting closer and closer to the depressing timing, the answer at step SP14 is given negative, and the controller 90 waits for the depressing timing.

When the depressing timing comes, the answer at step SP14 is given affirmative, and the controller 90 supplies the driving signal to the photo-emitting unit or units 96b associated with the black/white key or keys 87/88 to be depressed. The photo-emitting unit or units 96b radiate light as by step SP15, and informs the player that the depressing timing comes. Then, the player depresses the black/white key or keys 87/88, and the acoustic sound or sounds are produced. The photo-emitting unit or units 96b continuously radiate the light until the releasing timing.

Upon completion of the instruction to the photo-emitting unit or units 96b, the controller 90 searches the internal memory for the next black/white key or keys 87/88, and determines the black/white key or keys 87/88 between the previously depressed key or keys and the next black/white key or keys 87/88 to be depressed. This means that the controller 90 determines the direction to move the hand or hands from the presently depressed key or keys toward the next black/white key or keys 87/88 as by step SP16.

Subsequently, the controller 90 selects a black/white key 87/88 from the black/white keys 87/88 between the presently depressed key and the next key or keys, and supplies the driving signal to the photo-emitting unit 96a associated with the selected black/white key 87/88 as by step SP17. The photo-emitting unit 96a at the intermediate position informs the player of the direction toward the next black/white keys 87/88 to be depressed, and the player is made ready for moving the hand or hands.

The controller 90 returns to step SP12, and repeats the loop consisting of steps SP12 to SP17 until the final tone or tones are produced. Thus, the controller 90 informs the player of the black/white key or keys 87/88 to be depressed, the depressing timing and the direction to move the hand or hands toward the next black/white key, and renders the player practicing the tune under the guidance of the optical indication.

The optical indicator may have three photo-emitting units radiating differently colored light beams. In this instance, the three photo-emitting units may indicate the preparatory timing, the depressing timing and the direction to move the hand or hands, respectively.

If there are plural black/white keys 87/88 between the presently depressed key and the next key, the controller 90 may instructs the photo-emitting units 96a associated with those black/white keys 87/88 to sequentially radiate the light at short intervals. The controller 90 may cause the photo-emitting units 96a to radiate the light from the key closest to the presently depressed key toward the key farthest from the presently depressed key. In order to sequentially radiate the light from the photo-emitting units between the presently depressed key and the next key, the controller 90 calculates the lapse of time from the depressing timing for the presently depressed key to the preparatory timing or the depressing timing for the next key, and divides the lapse of time by the number of black/white keys between the presently depressed key and the next key. Then, the quotient is representative of the time intervals for changing the photo-emitting units, and the controller 90 changes the destination of the driving signal at the time intervals. The player follows the sequential photo-radiation, and easily moves the hand toward the next black/white key or keys. Moreover, the time intervals are inversely proportional to the distance between the presently depressed key and the next key, and the player can forecast the position of the next key on the basis of the time intervals.

Driving Signal Line

Figure 17:
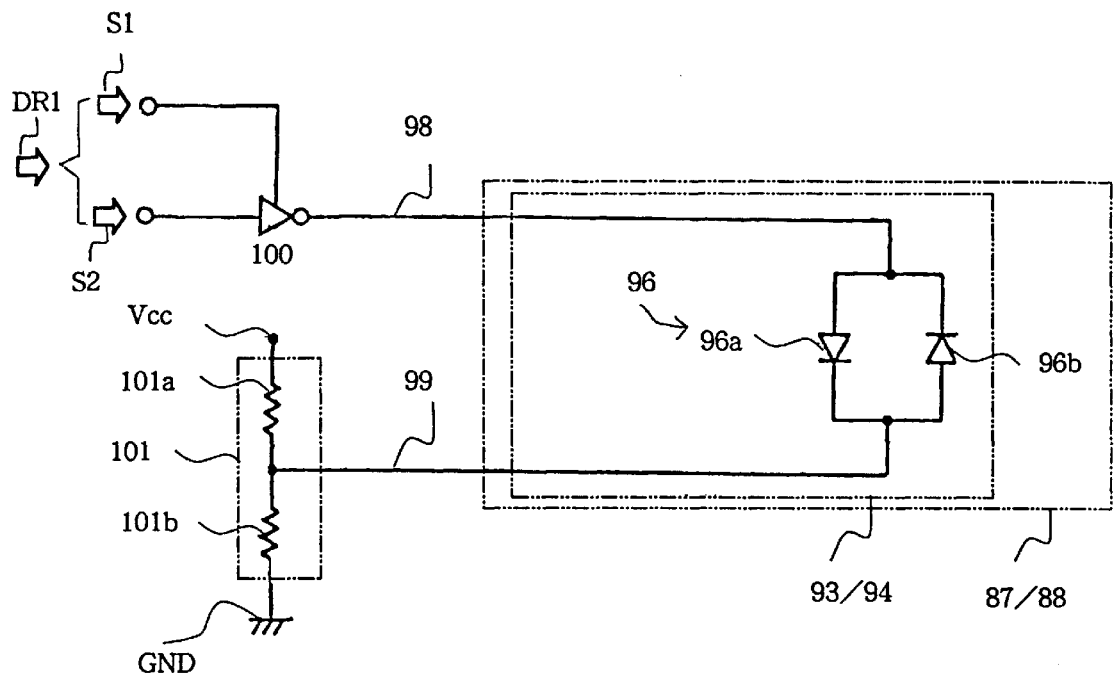
FIG. 17 is a diagram showing the circuit configuration of a part of a composite flexible indicator incorporated in the electric tutor shown in FIG. 14.

The driving signal is selectively supplied to the photo-emitting units 96a/96b, and the plural photo-emitting units 96a/96b requires more than one pair of driving signal lines. The driving signal lines are formed on the flexible insulating strip 93/94, and increases the weight of the composite flexible indicator. FIG. 17 shows a pair of signal lines 98/99 for selectively supplying the driving signal to the photo-emitting units 96a/96b.

The photo-emitting units 96a/96b are implemented by light-emitting diodes, and radiate olive light and red light, respectively. The driving signal DR1 is a two-bit signal. The first bit S1 is supplied to a control node of an inverter 100, and changes the inverter 100 between high-impedance state and low-impedance state. On the other hand, the second bit S2 is supplied to an input node of the inverter 100, and is representative of the color, i.e., the olive light or the red light. The second bit S2 is changed between 5 volts and zero volt. The output node of the inverter 100 is connected to the signal line 98, and the signal line in turn is connected to the anode of the light-emitting diode 96a and the cathode of the other light-emitting diode 96b.

A voltage divider 101 is connected to the other signal line 99, which in turn is connected to the cathode of the light-emitting diode 96a and the anode of the light-emitting diode 96b. The voltage divider 101 is implemented by a series combination of resistors 101a/101b. The resistor 101a is equal in resistance to the other resistor 101b, and the series combination is connected between a positive power supply line Vcc and a ground line GND. The positive power supply line Vcc is regulated to 5 volts, and the signal line 99 is connected to an output node between the resistor 101a and the other resistor 101b. For this reason, the signal line 99 is regulated to 2.5 volts.

Figure 18:
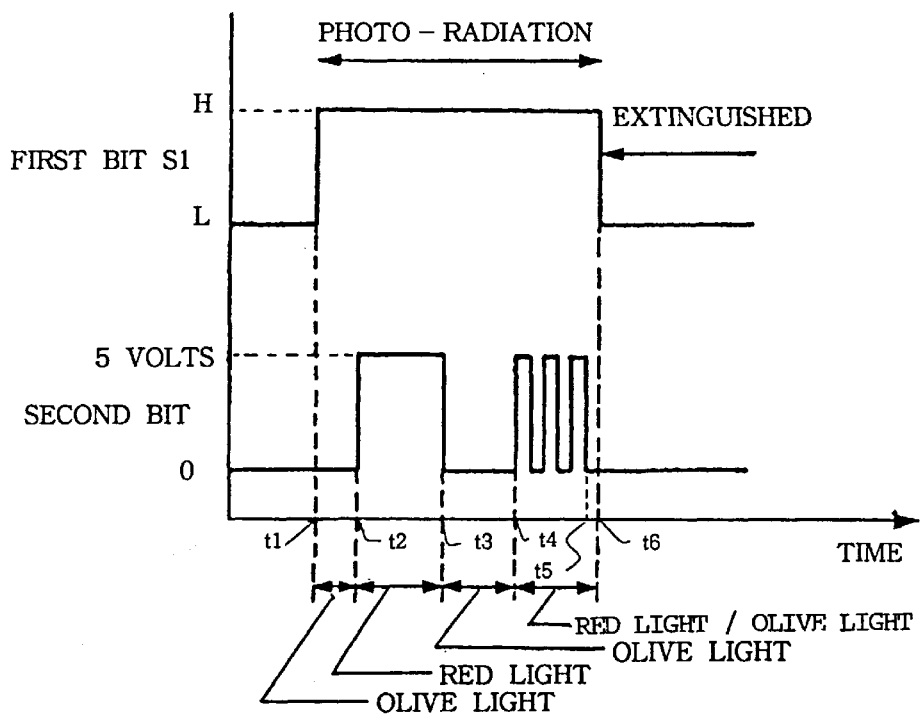
FIG. 18 is a timing chart showing a control for an optical indicator.

The controller 90 instructs the optical indicator 96 to selectively radiate the red light and the olive light as follows. FIG. 18 illustrates a control of photo-radiation with the driving signal DR1. While the first bit S1 is in an inactive low level L, the inverter 100 stays in high-impedance state. Any electric current does not flow through the light-emitting diodes 96a/96b, and the light-emitting diodes 96a/96b are extinguished.

The controller 90 changes the first bit S1 from the inactive low level L to an active high level H between time t1 and time t6. The first bit S1 of the active high level H renders the inverter 100 responsive to the second bit S2. The second bit S2 is maintained at zero volt, from time t1 to time t2, and the inverter 100 connects the signal line 98 to a source of zero volt. Then, the light-emitting diode 96b is forwardly biased, and radiates the olive light from time t1 to time t2.

The controller 90 changes the second bit S2 from zero volt to 5 volts at time t2, and maintains the second bit S2 at 5 volts between time t2 and time t3. The inverter 100 changes the signal line 98 to zero volt, and maintains the signal line 98 at zero volt. Then, the light-emitting diode 96b is forwardly biased, and radiates the red light from time t2 to time t3.

The controller 90 changes the second bit S2 from 5 volts to zero volt at time t3, and maintains the second bit S2 at 5 volts from time t3 to time t4. The inverter 100 changes the signal line 98 to 5 volts, and the light-emitting diode 96a is forwardly biased. For this reason, the optical indicator 96 radiates the olive light between time t3 and time t4. The controller 90 swings the second bit S2 between 5 volts and zero volt, and the light-emitting diodes 96a/96b alternately radiate the olive light and the red light between time t4 and time t6. The olive light is mixed with the red light, and the optical indicator 96 radiates orange light. Thus, the optical indicator 96 selectively radiates the olive light, the red light and the orange light depending upon the second bit S2 of the driving signal DR1, and the optical indicator 96 is energized through the pair of signal lines 98/99.

As will be understood from the foregoing description, each optical indicator 96 requires only one pair of signal lines 98/99 for selectively energizing the light-emitting diodes 96a/96b, and the pair of signal lines 98/99 keeps the flexible insulating strip 93/94 so deformable as to be closely laminated on the black/white key 87/88 by the self-weight.

Sixth Embodiment

Figure 19:
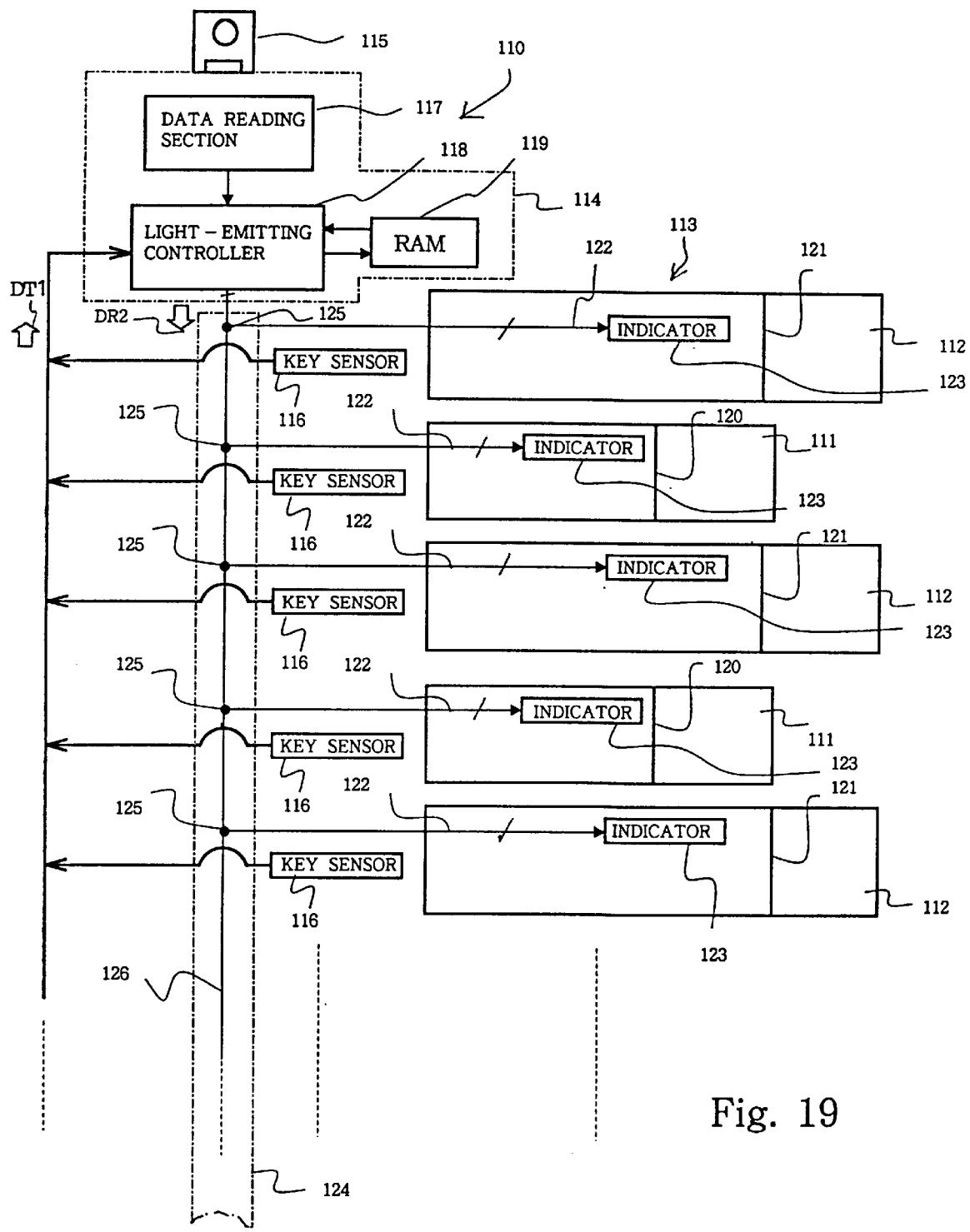
FIG. 19 is a block diagram showing an electric tutor assembled with a keyboard musical instrument.

Turning to FIG. 19 of the drawings, another electric tutor 110 is assembled with a keyboard musical instrument. The keyboard musical instrument has black/white keys 111/112 arranged in the pattern of piano keyboard.

The electric tutor 110 comprises a composite flexible indicator 113, a controller 114 connected to the composite flexible indicator 113, an information storage medium such as a floppy disk 115 for storing music data codes representative of a tune and key sensors 116 connected to the controller 114. The floppy disk 115 stores music data codes representative of at least one tune. The controller 114 includes a data reading section 117, a light emitting controller 118 and a random access memory device 119, which is abbreviated as "RAM" in FIG. 19. The floppy disk 115 is inserted into the data reading section 117, and the data reading section 117 transfers the music data codes to the random access memory device 119.

The light emitting controller 118 sequentially determines the black/white key or keys 111/112 to be depressed on the basis of the music data codes, and supplies a driving signal DR2 to the composite flexible indicator 113 after receipt of a detecting signal or signals DT1 from the key sensor or sensors 116.

The composite flexible indicator 113 includes flexible insulating strips 121/122 laminated on the black/white keys 111/112, signal lines 122 printed on the flexible insulating strips 121/122, optical indicators 123 attached to the flexible insulating strips 120/121, respectively, a rigid printed board 124 attached to a stationary member of the keyboard musical instrument and connectors 125 provided between the rigid printed board 124 and the flexible insulating strips 120/121. A conductive pattern 126 is formed on the rigid printed board 124, and the connectors 125 electrically connect the conductive pattern 126 to the signal lines 122.

The key sensors 116 is associated with the black/white keys 111/112, respectively, and monitor the associated keys 111/112 to see whether a player depresses the key or keys 111/112 under the guidance of the optical indication. When the player depresses the black/white key or keys 111/112 previously specified, the key sensor or sensors 116 supply a detecting signal or signals DT1 to the light emitting controller 118. The key sensors 116 are, by way of example, implemented by piezoelectric elements, and the black/white key 111/112 exerts force on the associated piezoelectric element on the way from the rest position toward the end position. Then, the piezoelectric element generates electric current serving as the detecting signal DT1, and supplies the detecting signal DT1 to the light emitting controller 118. An electromagnetic induction sensor and a photo coupler are available for the key sensor 116. A touch sensor may be attached to an upper surface of the front end portion of the black/white key 111/112 in order to generate the detecting signal DT1.

Assuming now that a player requests the electric tutor 110 to guide the fingers, the data reading section 117 reads out the music data codes from the floppy disk 115, and transfers them to the random access memory device 119. The light emitting controller 118 searches the random access memory device 119 for a black/white key or keys 111/112 to be firstly depressed, and supplies the driving signal DR2 to the optical indicator 123 associated with the black/white key or keys 111/112 to be firstly depressed. The optical indicator 123 radiates light at appropriate timing for depressing the key or keys 111/112, and informs the player of the key or keys to be firstly depressed.

The light emitting controller 118 searches the random access memory device 119 for black/white key or keys to be subsequently depressed, and checks the signal port to see whether or not the key sensor 116 associated with the firstly depressed key or keys have supplied the detecting signal or signals to the light emitting controller 118. If the key sensor or sensors 116 have already supplied the detecting signal or signals DT1, the light emitting controller 118 supplies the driving signal DR2 to the optical indicator 123 associated with the black/white key or keys to be subsequently depressed at the depressing timing. However, if the player has not depressed the black/white key or keys, the light emitting controller 118 does not find the detecting signal DT1, and the light emitting controller 118 waits for the detecting signal DT1. Upon receiving the detecting signal DT1, the light emitting controller 118 supplies the driving signal DR2 to the optical indicator or indicators 123 associated with the black/white key or keys to be subsequently depressed. Thus, the controller 114 keeps pace with the fingers of the player, and a beginner would appreciate the guidance keeping the pace with his capability.

Seventh Embodiment

Figure 20:
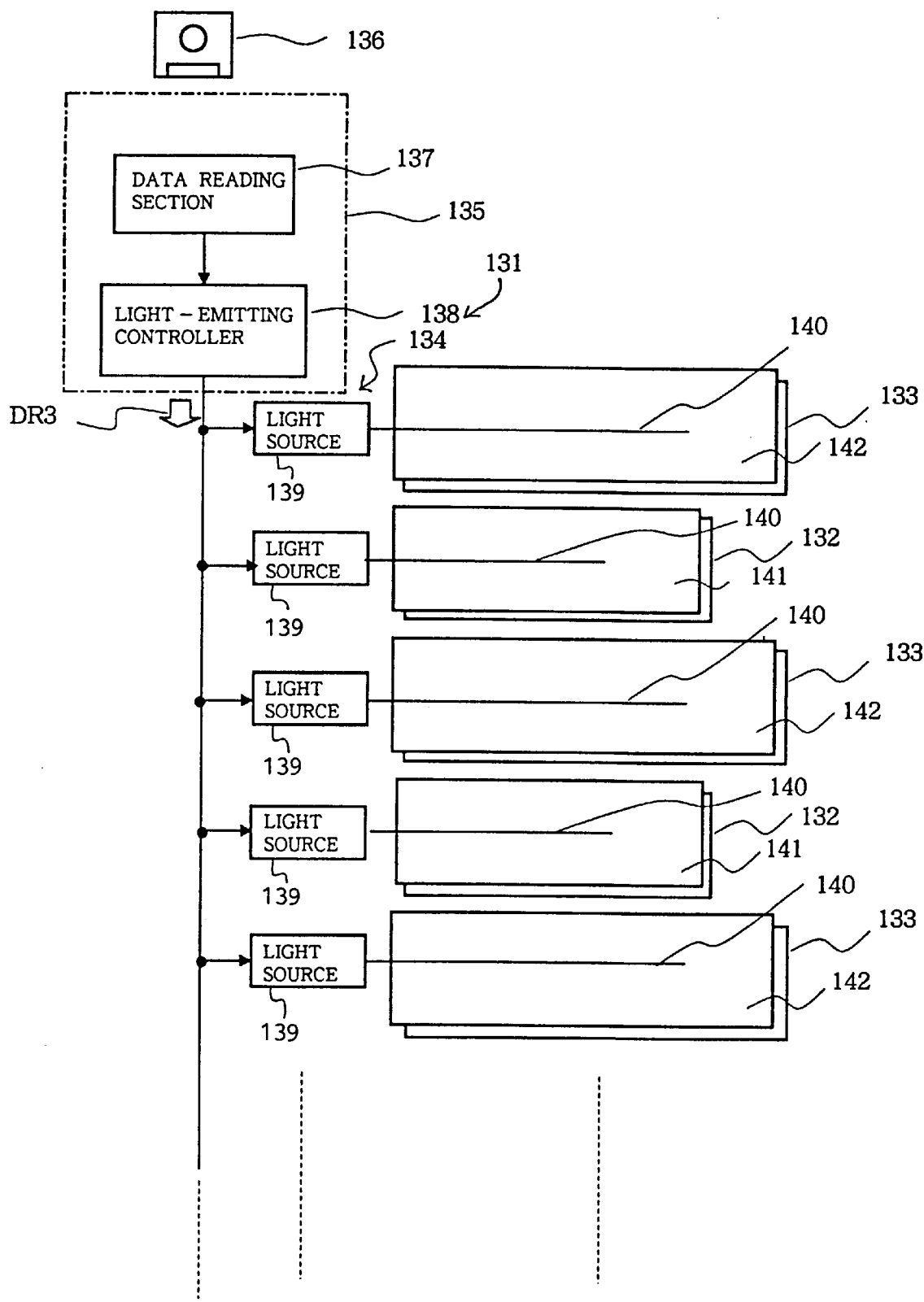
FIG. 20 is a block diagram showing another electric tutor assembled with a keyboard musical instrument.

FIG. 20 illustrates another electric tutor 131 assembled with a keyboard musical instrument. The keyboard musical instrument has black/white keys 132/133 arranged in the pattern of piano keyboard.

The electric tutor 131 largely comprises a composite flexible indicator 134, a controller 135 connected to the composite flexible indicator 134 and an information storage medium such as, for example, a floppy disk 136. The floppy disk 136 stores music data codes representative of at least one tune, and the controller 135 includes a data reading section 137 reading out the music data codes from the floppy disk 136 and a light emitting controller 138 for producing a driving signal DR3 from the music data codes.

The composite flexible indicator 134 includes plural light sources 139 located spaced from the black/white keys 132/133 and flexible optical waveguides 140 extending from the light sources 134 onto the black/white keys 132/133, respectively, and flexible strips 141/142 laminated on the black/white keys 132/133, respectively. The flexible strip 141/142 and the flexible optical waveguide 140 are so light that the player feels the key touch unchanged. Moreover, the flexible strip 141/142 and the flexible optical waveguide 140 do not offer substantial resistance against the key motion, and the key touch is unchanged.

The flexible strips 141/142 may be replaced with a single comb-like flexible sheet or plural comb-like flexible sheets. In this instance, the light sources 139 are supported by a rigid board attached to a stationary member of the keyboard musical instrument, and the light sources 139 are optically connected through optical connector to the flexible optical waveguides 140. The comb-like flexible sheet or sheets may be pinched by the optical connectors, and the electric tutor 131 may be easily assembled with the keyboard musical instrument.

The light sources 139 are not placed on the flexible strips 141/142, and are stationary. The light sources 139 are selectively energized with the driving signal DR3 for radiating light. The light is incident into the flexible optical waveguide 140, and is propagated through the flexible optical waveguide 140. Though not shown in FIG. 20, partition walls are provided between the light sources 139, and the light is not incident into the adjacent flexible optical waveguide 140.

Examples of the light source 139 are a light-emitting diode, an incandescent electric lamp, a fluorescent lamp, a metal halide lamp and a laser emitting device. The light emitting controller 138 may vary the light intensity of the radiated light. If the flexible strips 141/142 and the flexible optical waveguides 140 are appropriately selected, the manufacturer arbitrarily controls the brightness without increasing the production cost.

The flexible optical waveguides 140 are attached to the flexible strips 141/142, and have respective front ends, which are retracted from the front ends of the black/white keys 132/133. The front ends of the flexible strips 141/142 per se may be spaced from the front ends of the black/white keys 132/133 so that the flexible optical waveguides 140 reach the front ends of the flexible strips 141/142, respectively. For this reason, the player does not depress the flexible optical waveguides 140. If the manufacturer wants to prolong the flexible optical waveguides 140 to the front ends of the black/white keys 132/133, the flexible optical waveguides 140 may be covered with photo-transmissible cover members (not show), or may be embedded in the photo-transmissible cover members. If the cover members are semi-transparent, the player sees the light as if it comes from the entire surface of the semi-transparent cover member. When the optical diffusing filler is dispersed in the transparent/semi-transparent cover member, the transparent/semi-transparent cover member has a certain distribution of light intensity.

The flexible optical waveguide 140 radiates light from the entire optical path or from the front end thereof. The flexible optical waveguide 140 radiating the light from the entire optical path is obtained by using transparent liquid polymer, transparent solid polymer or mixing an optical diffusing filler in a semi-transparent matrix.

The optical diffusing filler has plural refractive indexes, and a typical example of the optical diffusing filler is spherical silica particle. The grain size of the spherical silica particle or the concentration thereof may be regulated to a certain distribution. Then, the flexible optical waveguide varies the light intensity radiated from the side surface. Otherwise, the spherical silica particle renders the flexible optical waveguide 140 uniformly radiating the light.

A typical example of the transparent liquid polymer is, by way of example, confined in a transparent soft tube of weather-proof vinyl chloride. The optical waveguide using the liquid polymer is, by way of example, sold as "Radac Light (product name)" manufactured by Bridgestone Corporation.

A typical example of the transparent solid polymer is acrylic resin. The acrylic resin may be confined within a weather-proof transparent soft tube. The transparent solid polymer is sold as "Radac Light-S (product name)" also manufactured by Bridgestone Corporation.

If the manufacturer wants to radiate the light from the front end of the flexible optical waveguide 140, an optical fiber is available for the flexible optical waveguides 140. The light sources 139 may be connected through optical fibers to the above described flexible optical waveguides 140 radiating the light from the entire optical paths and formed on the flexible insulating strips A scattering member or a reflector may be attached to the front end of each flexible optical waveguide 140.

Eighth Embodiment

Figure 21:
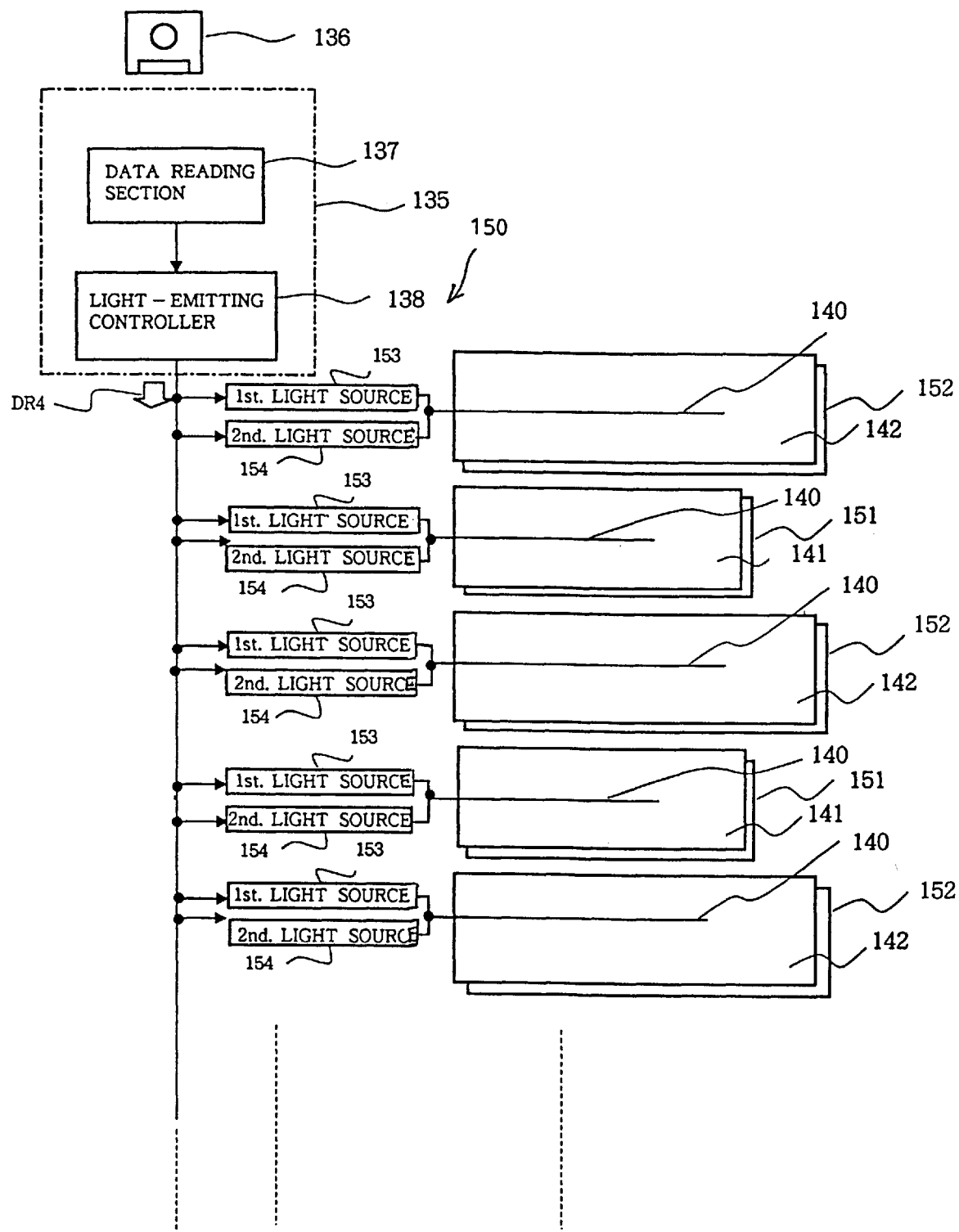
FIG. 21 is a block diagram showing yet another electric tutor assembled with a keyboard musical instrument.

FIG. 21 illustrates another electric tutor 150 assembled with a keyboard musical instrument. The keyboard musical instrument has black/white keys 151/152 arranged in the pattern of piano keyboard. The electric tutor 150 is similar to the electric tutor 131 except light sources 153/154, and the other components are labeled with the same references designating corresponding components of the electric tutor 131 without detailed description.

Pairs of light sources 153/154 are respectively associated with the flexible optical waveguides 140, and the light sources 153/154 radiate light beams different in color from each other. The light emitting controller 138 selectively supplies a driving signal DR4 to the first light source 153 and the second light source 154, and the first light source 153 or the second light source 154 radiates the light beam into the associated flexible optical waveguide 140.

The controller 135 may control the pairs of light sources 153/154 as similar to the controller 90 shown in FIG. 14 in order to achieve the advantages of the fifth embodiment. The pair of light sources 153/154 may be connected through the power supply circuit shown in FIG. 17. In this instance, the controller 135 supplies the two-bit driving signal, and the power supply circuit makes the conductive pattern simple. The pair of light sources 153/154 may be controlled as shown in FIG. 18. The flexible strips 141/142 may be replaced with a single comb-like flexible sheet or sheets connected to the light sources 153/154 by means of optical connectors.

In this instance, two light sources 153/154 are provided for each of the black/white keys 151/152. However, more than two light sources may be provided for each key 151/152.

Ninth Embodiment

FIG. 22 illustrate another electric tutor 160 assembled with an acoustic piano. The acoustic piano has black/white keys 161/162 arranged in the pattern of piano keyboard, and a key stop rail 163 laterally extends over the black/white keys 161/162.

The electric tutor 160 comprises a composite flexible indicator 164, a controller 165 connected to the composite flexible indicator 164 and an information storage medium such as a floppy disk 166. The controller 165 and the floppy disk 166 are similar to those of the first embodiment, and the composite flexible indicator 164 is only different from the composite flexible indicator 15 in flexible insulating strips 167/ 168. For this reason, description is focused on the flexible insulating strips 167/168.

The manufacturer varies the flexibility of the flexible insulating strips 167/168 between front end portions 167a/ 168a and rear end portions 167b/168b. The rear end portions 167b/168b are larger in flexibility than the front end portions 167a/168a, and the flexibility is varied in intermediate portions 167c/168c between the rear end portions 167b/168b and the front end portions 167a/168a. The rear end portions 167b/168b are formed of soft resin such as, for example, polypropylene, polyethylene, polyamide and vinyl chloride, fabric such as, for example, cloth and felt or flexible film.

When a player depresses the black/white key 161/162, the rear end portion 167b/168b is independently widely deformed, and allows the front end portion 167a/168a to follow the depressed black/white key 161/162. The rear end portions 167b/168b do not offer resistance against the key motions, and adjacent black/white key 161/162 is not unintentionally moved together.

On the other hand, the front end portions 167a/168a are so hard that the player feels the front end portions 167a/168a as if he directly depresses the black/white keys 161/162. It is necessary for the manufacturer to locate the intermediate portions 167c/168c at certain positions not depressed by the player.

The flexible insulating film varied in flexibility is available for the second to eighth embodiments.

Tenth Embodiment

FIG. 23 illustrates another electric tutor 170 embodying the present invention. The electric tutor 170 is similar to the electric tutor 1 except for flexible insulating strips 171/172. For this reason, description is focused on the flexible insulating strips 171/172. The flexible insulating strips 171/172 have respective front end portions 171a/ 172a, rear end portions 171b/172b and hinges 171c/172c connected between the front end portions 171a/172a and the rear end portions 171b/172b. When a player depresses black/white keys (not shown), the front end portions 171a/172a are rotated around the hinges 171c/172c, and follows the depressed keys. The hinges 171c/172c allows the front end portions 171a/172a to turn so smooth that adjacent black/ white keys are never unintentionally depressed.

The manufacturer can use any insulating material for the front end portions 171a/172a and the rear end portions 171b/172b. If the manufacturer forms the front end portions 171a/172a of insulating material as hard as the upper surfaces of the black/white keys, the player feels the front end portions 171a/172a as if he directly depresses the black/white keys. It is necessary for the manufacturer to locate the hinges 171c/172c at certain positions not depressed by the player. The flexible insulating strips 171/ 172 are available for the first to eighth embodiments.

As will be appreciated from the foregoing description, the composite flexible indicator according to the present invention radiates the light beams from the upper surfaces of the black/white keys regardless of the material used for the black/white keys, and the player clearly discriminates the optical indications.

Although particular embodiments of the present invention have been shown and described, it will be obvious to those skilled in the art that various changes and modifications may be made without departing from the spirit and scope of the present invention.

For example, the series of digital codes may be stored in a CD ROM or supplied through a telephone communication network. The electric tutor may simply instruct the player of the black/white keys to be depressed. In this instance, the light-emitting controller 41 simply changes the driving signals between an active level and an inactive level.

The electric tutor is applicable to any kind of keyboard musical instrument such as, for example, a grand piano, a harpsichord, an organ, an automatic player piano and an electronic keyboard musical instrument such as an electronic piano and an electronic organ. When the electric tutor is assembled with the electronic keyboard musical instrument, key monitors and tone generators serve as the sound generating means.

The flexible indicator block may be assigned to keys forming a part of an octave or keys forming more than one octave.

The data reading section may directly supply the music data codes to the light emitting controller without temporarily data storage.

A player may instruct the controller 114 to keep the pace with his fingering or proceed in accordance with the music score.

The electric tutor according to the present invention may be assembled with a keyboard musical instrument before delivery to user. Otherwise, the user assembles the electric tutor with a keyboard musical instrument already purchased.

Finally, the optical indicators may be used for a decorative illumination.

What is claimed is:

1. A keyboard musical instrument comprising:

a stationary member extending in a certain direction;

a keyboard including a plurality of keys arranged in said certain direction movable between respective rest positions and respective end positions with respect to said stationary member and having plane surfaces, respectively;

a sound generating means associated with said keyboard for producing sounds corresponding to depressed keys of said keyboard; and a photo-radiating system including a plurality of flexible strips having first end portions supported by said stationary member and second end portions respectively lying on said plurality of keys and moved together with said plurality of keys, and respectively having contours substantially corresponding to the surfaces of said plurality of keys, a plurality of optical indicators respectively attached to said second end portions over said plurality of flexible strips, and a driving signal supplying means electrically connected to said plurality of optical indicators and causing said plurality of optical indicators to selectively radiate rays of light along a tune.

2. The keyboard musical instrument as set forth in claim 1, in which said photo-radiating system causes said plurality of optical indicators to radiate said rays of light so as to inform a player of key or keys to be depressed for playing said tune.

3. The keyboard musical instrument as set forth in claim 2, in which said driving signal supplying means includes a conductive pattern formed on a rigid insulating member attached to said stationary member, a plurality of sets of conductive lines respectively formed on said plurality of flexible strips and connected to said plurality of optical indicators, respectively, and a plurality of connectors attached to said rigid insulating member and electrically connecting said plurality of sets of conductive lines to said conductive pattern.

4. The keyboard musical instrument as set forth in claim 2, in which predetermined flexible strips of said plurality of flexible strips have the respective first end portions branched from a connecting portion so as to be integrated into a flexible sheet.

5. The keyboard musical instrument as set forth in claim 4, in which said flexible sheet is supported by said stationary member through connectors.

6. The keyboard musical instrument as set forth in claim 5, in which said connectors have conductive lines forming parts of said driving signal supplying means.

7. The keyboard musical instrument as set forth in claim 6, in which said driving signal supplying means further includes a conductive pattern formed on a rigid insulating member attached to said stationary member, and a plurality of sets of conductive lines respectively formed on said plurality of flexible strips and connected to said plurality of optical indicators, respectively.

8. The keyboard musical instrument as set forth in claim 6, in which said flexible sheet is detachably connected to said connectors.

9. The keyboard musical instrument as set forth in claim 2, in which said plurality of flexible strips are deformable.

10. The keyboard musical instrument as set forth in claim 9, in which said first end portion of each of said plurality of flexible strips is larger in flexibility than said second end portion thereof.

11. The keyboard musical instrument as set forth in claim 10, in which the hardness of said second end portion is closer to the upper surface portion of associated one of said plurality of keys than said first end portion.

12. The keyboard musical instrument as set forth in claim 9, in which said first end portion and said second end portion of each of said plurality of flexible strips are connected by means of a hinge.

13. The keyboard musical instrument as set forth in claim 2, further comprising a plurality of photo-transmittable cover members respectively attached to said plurality of flexible strips so as to cover said plurality of optical indicators.

14. The keyboard musical instrument as set forth in claim 13, in which said plurality of photo-transmittable cover members are semi-transparent so that said rays of light illuminate the entire surfaces of said plurality of photo-transmittable cover members.

15. The keyboard musical instrument as set forth in claim 14, in which said plurality of photo-transmittable cover members contain a photo-diffusing filler.

16. The keyboard musical instrument as set forth in claim 15, in which said photo-diffusing filler is spherical silica particles.

17. The keyboard musical instrument as set forth in claim 2, in which said second end portions are offset from front end portions of said plurality of keys so that a player directly depresses said front end portions with fingers.

18. The keyboard musical instrument as set forth in claim 2, in which each of said plurality of optical indicators has at least one light source for radiating one of said rays of light.

19. The keyboard musical instrument as set forth in claim 2, in which each of said plurality of optical indicators has a plurality of light sources for radiating one of said rays of light.

20. The keyboard musical instrument as set forth in claim 19, in which said plurality of light sources of said each optical indicator respectively generate a plurality of sub-rays of light different in color from one another.

21. The keyboard musical instrument as set forth in claim 20, in which said plurality of light sources are alternately energized at short intervals so as to generate said one of said rays of light with an intermediate color between the colors of said plurality of sub-rays.

22. The keyboard musical instrument as set forth in claim 19, in which said driving signal supplying means supplies a driving signal to one of said plurality of light sources at a preparatory timing before a depressing timing when a player is expected to depress one of said plurality of keys associated with said plurality of light sources, and, thereafter, supplies said driving signal to another of said plurality of light sources at said depressing timing.

23. The keyboard musical instrument as set forth in claim 22, in which said one of said plurality of light sources radiates one of said plurality of sub-rays for a short while so that said one of said plurality of sub-rays is extinguished before said depressing timing.

24. The keyboard musical instrument as set forth in claim 22, in which said another of said plurality of light sources continuously radiates another of said plurality of sub-rays from said depressing timing to a releasing timing when said player is expected to release said one of said plurality of keys.

25. The keyboard musical instrument as set forth in claim 22, in which said driving signal supplying means further supplies said driving signal to at least one of said plurality of optical indicators associated with another of said plurality of keys located between said one of said plurality of keys and yet another of said plurality of keys subsequently to be depressed after said depressing timing for said one of said plurality of keys.

26. The keyboard musical instrument as set forth in claim 22, in which said driving signal supplying means further supplies said driving signal to others of said plurality of optical indicators associated with others of said plurality of keys located between said one of said plurality of keys and another of said plurality of keys subsequently to be depressed after said depressing timing for said one of said plurality of keys.

27. The keyboard musical instrument as set forth in claim 26, in which said driving signal supplying means sequentially supplies said driving signal to said others of said plurality of optical indicators so as to sequentially illuminate said other of said plurality of optical indicators toward said another of said plurality of keys subsequently to be depressed.

28. The keyboard musical instrument as set forth in claim 26, in which said other of said plurality of optical indicators is illuminated for a time period inversely proportional to the number of said others of said plurality of keys.

29. The keyboard musical instrument as set forth in claim 19, in which said plurality of light sources of each of said plurality of optical indicators includes a first light-emitting diode having an anode connected to a first conductive line and a cathode connected to a second conductive line, and a second light-emitting diode having an anode connected to said second conductive line and a cathode connected to said first conductive line, and said driving signal supplying means supplies an intermediate voltage between a first voltage and a second voltage to said first conductive line and selectively supplies said first voltage and said second voltage to said second conductive line so as to selectively bias said first light-emitting diode and said second light-emitting diode with a forwardly biased voltage.

30. The keyboard musical instrument as set forth in claim 2, in which each of said plurality of optical indicators includes a light source for radiating one of said rays of light, and an optical waveguide optically connected to said light source and extending on one of said plurality of flexible strips for propagating said one of said rays of light.

31. The keyboard musical instrument as set forth in claim 30, in which said one of said rays of light is radiated from at least part of side surface of said optical waveguide on said one of said plurality of flexible strips.

32. The keyboard musical instrument as set forth in claim 30, in which said one of said rays of light is radiated from an entire side surface of said optical waveguide on said one of said plurality of flexible strips.

33. The keyboard musical instrument as set forth in claim 30, in which said optical waveguide is implemented by an optical fiber so that said one of said rays of light is radiated from a front end of said optical fiber.

34. An electric tutor associated with a keyboard musical instrument having a plurality of keys, comprising:

a plurality of flexible strips having first end portions supported by a stationary member and second end portions respectively lying on said plurality of keys and moved together with said plurality of keys, a plurality of optical indicators respectively provided on said plurality of flexible strips, and a driving signal supplying means electrically connected to said plurality of optical indicators and causing said plurality of optical indicators to selectively radiate rays of light along a tune so as to inform a player of an order of said plurality of keys to be depressed.

* * * * *